United States Patent
Döge et al.

(10) Patent No.: US 10,580,123 B2
(45) Date of Patent: Mar. 3, 2020

(54) DEVICE AND METHOD OF COMBINING MEASUREMENT SIGNALS FROM ILLUMINATION SIGNALS

(71) Applicant: Fraunhofer-Gesellschaft zur Förderung der angewandten Forschung e.V., München (DE)

(72) Inventors: Jens Döge, Dresden (DE); Christoph Hoppe, Dresden (DE); Holger Priwitzer, Dohna (DE)

(73) Assignee: FRAUNHOFER-GESELLSCHAFT ZUR FÖRDERUNG DER, München (DE)

( * ) Notice: Subject to any disclaimer, the term of this patent is extended or adjusted under 35 U.S.C. 154(b) by 0 days.

(21) Appl. No.: 16/137,729

(22) Filed: Sep. 21, 2018

(65) Prior Publication Data
US 2019/0026877 A1    Jan. 24, 2019

Related U.S. Application Data

(63) Continuation of application No. PCT/EP2017/056835, filed on Mar. 22, 2017.

(30) Foreign Application Priority Data

Mar. 22, 2016    (EP) .................... 16161795

(51) Int. Cl.
*G06T 5/50*    (2006.01)
*G06T 7/73*    (2017.01)
(Continued)

(52) U.S. Cl.
CPC ............ *G06T 5/50* (2013.01); *G01B 11/2513* (2013.01); *G01B 11/2518* (2013.01);
(Continued)

(58) Field of Classification Search
CPC ....................................................... H04N 13/00
(Continued)

(56) References Cited

U.S. PATENT DOCUMENTS

| 5,085,502 A | 2/1992 | Womack et al. |
| 6,765,606 B1 | 7/2004 | Iddan et al. |

(Continued)

FOREIGN PATENT DOCUMENTS

| JP | 2005 078239 A | 3/2005 |
| JP | 2010-519825 A | 6/2010 |

(Continued)

OTHER PUBLICATIONS

International Search Report issued in PCT/EP2017/056835 dated Jun. 9, 2017.

(Continued)

*Primary Examiner* — Anand S Rao
(74) *Attorney, Agent, or Firm* — McClure, Qualey & Rodack, LLP

(57) ABSTRACT

A device includes illuminator configured to emit first and second illumination signal having first and second illumination intensities, respectively, in the direction of a surface region of an object to be measured, the second illumination intensity being smaller than the first illumination intensity. The device includes sensor configured to provide a first and second measurement signals based on first and second reflections of the first and second illumination signals on the surface region, respectively. The device includes evaluator configured to combine the first and second measurement signals with each other so as to obtain a combination result from which a position of the first illumination signal on the surface region may be derived, wherein an influence of a
(Continued)

reflectance of the surface region within the combination result is reduced as compared to the influence on the first and second measurement signals.

20 Claims, 12 Drawing Sheets

(51) Int. Cl.
*H04N 5/225* (2006.01)
*G01B 11/25* (2006.01)
*G01M 1/12* (2006.01)
*G01B 21/04* (2006.01)

(52) U.S. Cl.
CPC ........... *G01B 21/045* (2013.01); *G01M 1/122* (2013.01); *G06T 7/74* (2017.01); *H04N 5/2256* (2013.01); *G06T 2207/10028* (2013.01); *G06T 2207/10152* (2013.01); *G06T 2207/20024* (2013.01); *G06T 2207/20212* (2013.01)

(58) Field of Classification Search
USPC ...................................... 348/42–60, 135–140
See application file for complete search history.

(56) References Cited

U.S. PATENT DOCUMENTS

| 8,000,438 | B2* | 8/2011 | Boyden ................ G01N 23/223 |
| | | | 378/44 |
| 8,669,511 | B2 | 3/2014 | Doege |
| 2001/0052985 | A1 | 12/2001 | Ono |
| 2010/0310126 | A1 | 12/2010 | Johannesson et al. |
| 2011/0062314 | A1 | 3/2011 | Doege |
| 2015/0015898 | A1 | 1/2015 | Atwell et al. |
| 2015/0036917 | A1 | 2/2015 | Nanri et al. |
| 2016/0010990 | A1 | 1/2016 | McGarry |

FOREIGN PATENT DOCUMENTS

| KR | 101222942 B1 | 1/2013 |
| WO | 2015/184308 A1 | 12/2015 |

OTHER PUBLICATIONS

Patrick Lichtsteiner et al.: "A 128 × 128 120 dB15 s Latency Asynchronous Temporal Contrast Vision Sensor", IEEE Journal of Solid-State Circuits, IEEE Service Center, Piscataway, NJ, USA, vol. 43, No. 2, Feb. 1, 2008, pp. 566-576, XP011200748, ISSN: 0018-9200, DOI: 10.1109/JSSC.2007.914337.

* cited by examiner

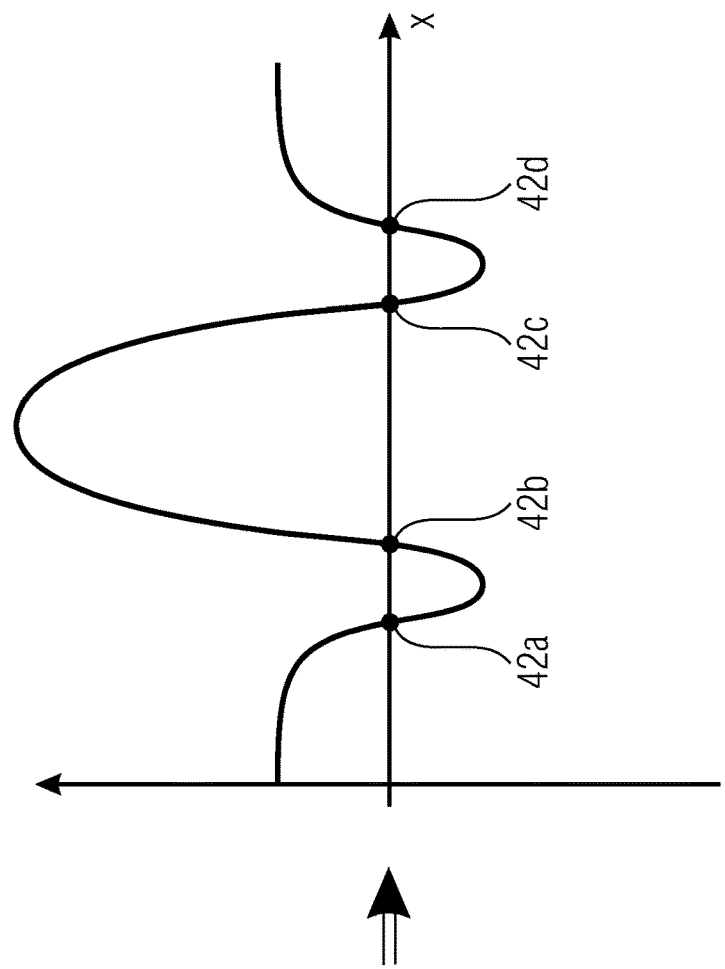
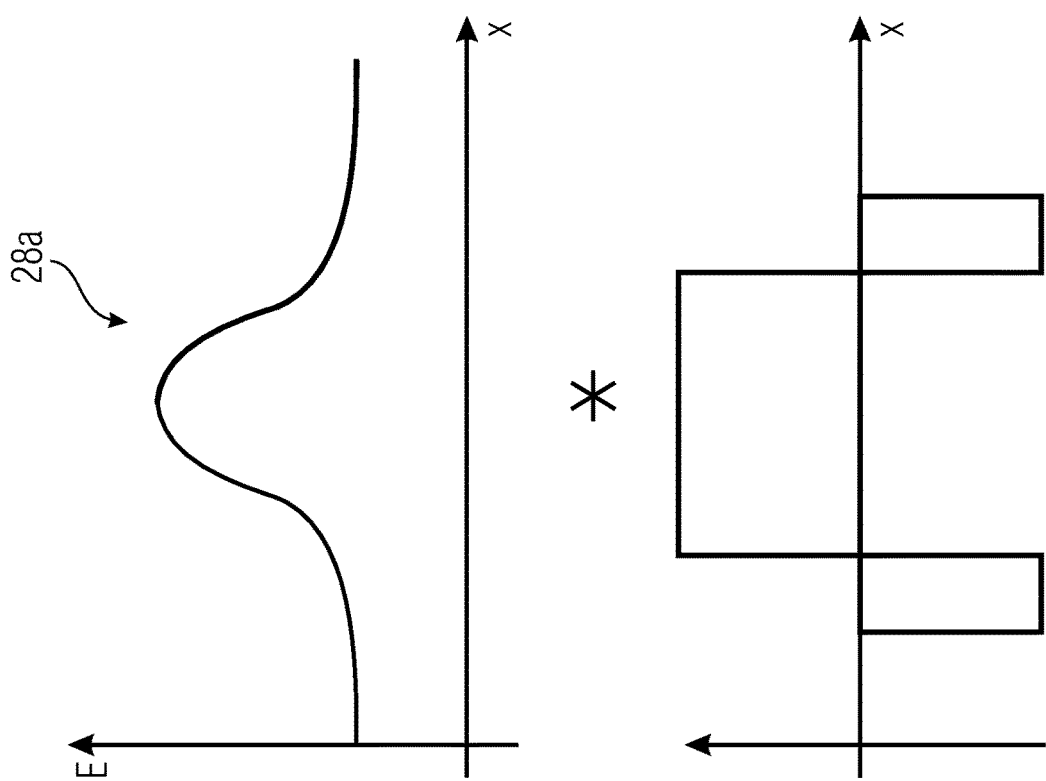
Fig. 5c
Fig. 5b

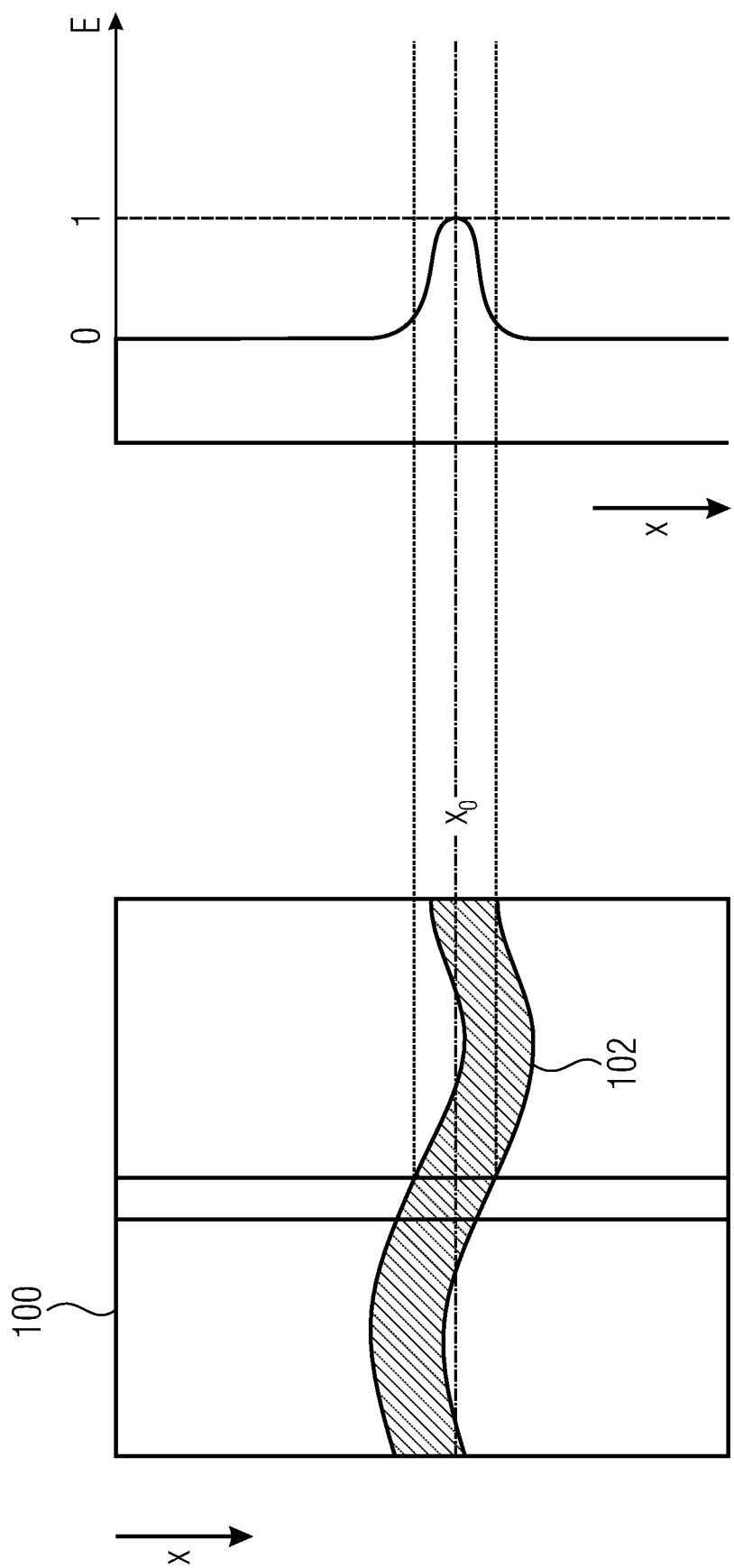

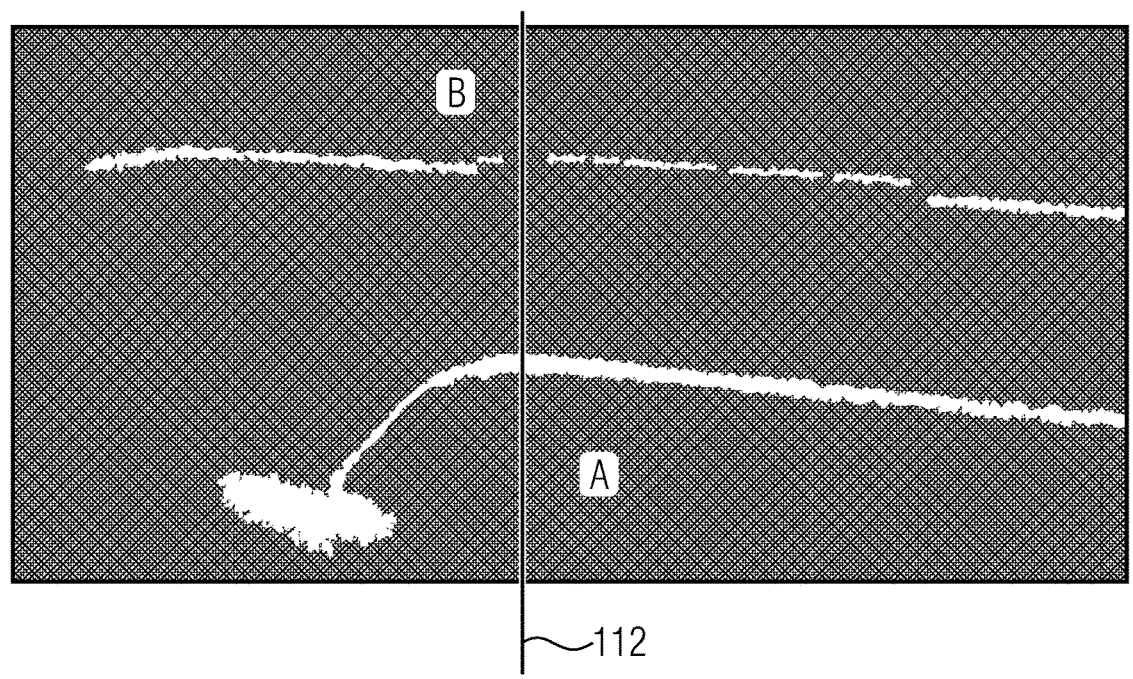
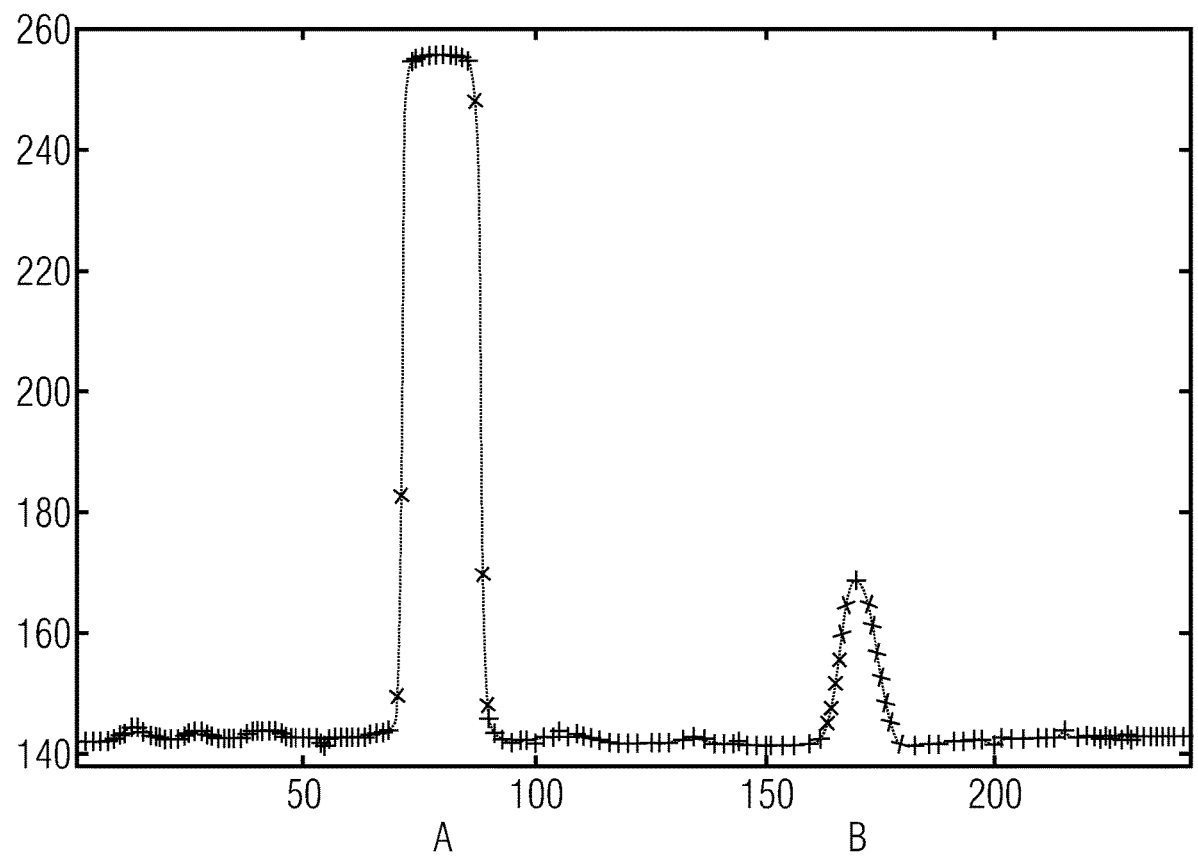
Fig. 12

DEVICE AND METHOD OF COMBINING MEASUREMENT SIGNALS FROM ILLUMINATION SIGNALS

CROSS-REFERENCES TO RELATED APPLICATIONS

This application is a continuation of copending International Application No. PCT/EP2017/056835, filed Mar. 22, 2017, which is incorporated herein by reference in its entirety, and additionally claims priority from European Application No. EP 16161795.6, filed Mar. 22, 2016, which is incorporated herein by reference in its entirety.

The present invention relates to a device for combining measurement signals, so that a position of an illumination signal on a surface region may be derived, and to a method of illuminating a surface region. In particular, the present invention relates to a method and a device for 3D measurement of high-contrast surfaces (high dynamic range, HDR) by means of laser light section triangulation (HDR-LL).

BACKGROUND OF THE INVENTION

Measuring of surfaces may be performed by using a laser light section method. This may give rise to problems. For example, with regard to intensities and reflectances, a high intensity of the laser light line may result in outshining and/or saturation to a maximum value in the image sensor used. This may result in that evaluation algorithms such as center of gravity (CoG) determination no longer work correctly. If a fixed threshold value is used for determining the position, a large width of the laser light line comprising a constant brightness value may be ascertained, so that a position of the laser light line may be determined with difficulty only or in an imprecise manner. Low intensity of the laser light line may cause only a very small level to be sensed, so that a pronounced influence of the noise will prevail. This leads to uncertainty in the determination of the center of gravity due to the noise. In addition, large dynamics within the image, e.g. of 200:1 and more, may result in that differences in the image can no longer be balanced off and/or that regions having small and large intensities will arise, which may lead to the difficulties described above.

If one looks at the evaluation of a transfer function, which may be used as a possibility of correcting the problem of contrast, this will be possible in various modes of operation. There is the possibility of linear operation. This offers the advantage that by means of CoG, there is an efficient method at hand for accurately determining the location of a Gaussian laser line. However, this entails the disadvantage that in the event of a superposition of a reflectance leap and a laser line, there will be a change in the signal value, as may be shown by the following formula:

$$S = \frac{RE}{K},$$

wherein S designates the signal value, R designates the reflectance of the surface, E designates irradiated energy ($E_e$), and K designates a normalization quantity. Said change, or step, in the signal value results in a shift in the optical center of gravity and, therefore, in an error in determining the position of the laser line. Outshining in the bright areas also causes CoG determination to be erroneous or to no longer work. Underexposure of the dark areas results in that no more signal will be visible. As of a specific value, the contrast prevents that all of the brightness stages can be captured in one image.

There is further the possibility of logarithmic operation, which offers the advantage that a solution to the problem of contrast may be obtained. In the formula $$S_l = \log\left(\frac{RE}{K}\right),$$

$S_l$ describes a logarithmic signal value. Said evaluation enables compression of the signal, so that a larger contrast within the image no longer results in suppression of the dark areas. This entails the disadvantage that CoG can no longer be applied due to the non-linear characteristic on the image, so that threshold methods will be applied. However, it is difficult to select suitable thresholds for the threshold methods due to the signal variation caused by the reflectance. Moreover, there is the risk of transient oscillation of the logarithmic (log) circuit.

Moreover, there is the possibility of multilinear operation. This offers the advantage that a solution to the problem of contrast may be obtained by compressing the signal, so that a larger contrast in the image no longer results in suppression of the dark areas. What is disadvantageous, however, is that CoG can no longer be applied due to the non-linear characteristic on the image, so that during logarithmic operation, too, threshold methods have to be applied, which results in difficulty in selecting suitable thresholds due to the signal variation caused by reflection. At the so called breakpoints, i.e. points comprising reflectance leaps, difficulties regarding association of the signals, and, therefore, inaccuracies will arise.

Further, there is the possibility of multi-exposure operation, which offers the advantage that a solution to the problem of contrast is found also by compressing the signal, so that a large contrast in the image no longer results in suppression of the dark areas. However, what is disadvantageous is that due to the non-linear characteristic on the image, CoG can no longer be applied, so that threshold methods are used which result in difficulty in selecting suitable thresholds due to the signal variation caused by reflectance. Also, at the breakpoints there will be difficulties regarding associating of the signals and, thus, there will be inaccuracies. In addition, temporal artifacts will occur due to illumination being effected at different points in time.

Known concepts utilize reading out of brightness information. For describing the process of determining a position $x_0$ of the center of the reproduction of a laser line in column $y_0$ on a sensor matrix, reference will be made below to FIGS. 9a, 9b and 10a to 10c. Known concepts will be explained with reference to FIGS. 11a to 11c. FIG. 9a shows a sensor matrix 100 wherein pixels are arranged in columns along a direction x, several columns being arranged next to one another along a y direction. Thus, pixel and/or column positions are arranged along the x direction, whereas row positions are arranged along the y direction. The pixels have a laser line 102 depicted thereon. It is the aim of the evaluation, for example, to determine, within a column $y_0$, a position $x_0$ of the laser line 102 within the sensor matrix 100.

FIG. 9b shows a schematic diagram of the intensity distribution E within column $y_0$ across the pixel position x. An intensity minimum is depicted, by way of example, by the value 0, and an intensity maximum is depicted by the value 1. The intensity E may also be described as an amplitude of the laser light line received.

In other words, FIGS. 9a and 9b show representations of determining the position $x_0$ of the laser line 102 within column $y_0$ on the sensor matrix 100 of an image sensor.

By way of example, FIGS. 10a to 10c show various possibilities of evaluating the intensity distribution in accordance with FIG. 9b. For example, FIG. 10a shows a linear evaluation of the intensity distribution of FIG. 9b. The progress of the curve essentially corresponds to that shown in FIG. 9b. In addition, the diagram of FIG. 10a shows a progress of a reflectance R at the measured object across the pixel position x.

FIG. 10b shows a schematic representation of pixel values, i.e. signal values S, which may be detected at the image sensor, across the pixel position x. Within the area of the reflectance leap of FIG. 10a, intensity attenuation takes place which results in a shift 106 of the center of gravity, a so called CoG shift.

FIG. 10c shows a logarithmic representation of the signal value $S_l$. Even in the logarithmic representation, there is a shift 106', so that the CoG method is not applicable. Due to the logarithmic representation, the attenuated signal A may be enhanced above a noise threshold 108, so that a signal becomes detectable here as well.

FIGS. 11a, 11b and 11c show various possibilities of evaluation. FIG. 11a shows threshold evaluation with regard to a threshold $E_1'$. For reading out the brightness information, one or two threshold values $E_1'$ may be evaluated for determining a position of a rising ($x_a$) and/or falling ($x_b$) edge so as to enable calculation of the mean value $x_0$ of the position of the laser light line. This may be effected with a subpixel accuracy of 0.5 subpixels, as is indicated in FIG. 11b. This can be calculated in a simple and fast manner.

FIG. 11b shows an application of a linear transfer function, i.e. a Gaussian curve, for the CoG algorithm as is depicted, e.g., in FIG. 9b or 10a, so as to determine the maximum. A subpixel accuracy of up to 1/64 may be obtained; in most cases, a subpixel accuracy up to only 1/8 or to 1/16 is reasonable. However, this involves significantly more expenditure than utilizing the edges $x_a$ and/or $x_b$, and will involve, among other things, analog-to-digital conversion and reading out of the recorded full frame.

FIG. 11c shows utilization of a non-linear transfer function. Implementation may be effected by means of a field-programmable gate array (FPGA) or PC. In the event of a non-linear characteristic, a curve-fitting algorithm may be used, wherein an accuracy of up to 1/64 subpixels may be obtained; here, too, only a range from 1/8 to 1/16 is useful in most cases. Said variant involves more expenditure than utilizing a linear transfer function, also involves analog-to-digital conversion and reading out of the full frame, and may be implemented by means of FPGA or PC. The algorithms described are either imprecise or they involve an analog read-out of the sensor matrix. The algorithms for the linear transfer function and/or the curve-fitting algorithm involve a relatively large amount of expenditure and, in the event of large requirements concerning speed, are implemented in an FPGA in most cases.

In other words, FIGS. 11a to 11c show representations of the variants for determining the position $x_0$ of a laser line along a column.

The fundamental problem in column-by-column search for the exact position of the laser line consists in the nature and reflectance of the surface. Said parameters influence the amount of laser light impinging on the image sensor of the measuring camera from the surface to be measured. The better the reflection properties regarding the solid angle observed by the measuring camera, the more light one will be able to observe. This is depicted in FIG. 12, where at the point marked by A, large reflectance results in large brightness, and where at a point marked by B, little reflectance results in little brightness. For determining the position of the laser line, one uses the brightness distribution along the line 112 between points A and B, which is depicted at the abscissa in the lower area of FIG. 12. In other words, FIG. 12 shows laser lines on surfaces having different reflectances in the upper area and shows a section through both lines in the lower area. The reflectance at point A is comparatively large, and that at point B is comparatively small.

FIGS. 10a to 10c depict the fundamental problems. In the event of a leap of the reflectance of the surface examined, the signal of the laser line will also vary, so that in the event of evaluation by means of CoG or the threshold method, the position of the maximum will shift. In other words, FIGS. 10a to 10c show a progress of the brightness in the event of a reflectance leap, wherein FIG. 10a shows the amplitude of the laser line across the pixel position x and FIG. 10b shows a value within a pixel which is scaled in a linear manner, and FIG. 10c presents said value in a logarithmic ratio.

What would therefore be desirable are devices and methods enabling highly accurate determining of a position of an illumination signal on a surface region.

SUMMARY

According to an embodiment, a device may have: illumination means configured to emit a first illumination signal having a first illumination intensity and a second illumination signal having a second illumination intensity in the direction of a surface region of an object to be measured, the second illumination intensity being smaller than the first illumination intensity; sensing means configured to provide a first measurement signal based on a first reflection of the first illumination signal on the surface region, and to provide a second measurement signal based on a second reflection of the second illumination signal on the surface region; evaluation means configured to combine the first measurement signal and the second measurement signal with each other so as to obtain a combination result from which a position of the first illumination signal on the surface region may be derived, wherein an influence of a reflectance of the surface region within the combination result is reduced as compared to the influence on the first and second measurement signals, wherein the evaluation means is configured to form a first logarithmized value on the basis of the first measurement signal and to form a second logarithmized value on the basis of the second measurement signal, wherein in the first logarithmized value and in the second logarithmized value, the influence of the reflectance is an addend, so that by subtracting the second logarithmized value from the first logarithmized value in order to obtain the combination result, the influence of the reflectance will be reduced; wherein the first illumination signal and the second illumination signal have an identical wavelength range and are equally influenced, at an identical point within the surface region, by the reflectance or reflectivity of the surface region.

According to another embodiment, a device may have: illumination means configured to emit a first illumination signal having a first illumination intensity and a second illumination signal having a second illumination intensity in the direction of a surface region of an object to be measured, the second illumination intensity being smaller than the first illumination intensity; sensing means configured to provide a first measurement signal based on a first reflection of the first illumination signal on the surface region, and to provide a second measurement signal based on a second reflection of the second illumination signal on the surface region; evaluation means configured to combine the first measurement signal and the second measurement signal with each other so as to obtain a combination result from which a position of the first illumination signal on the surface region may be derived, wherein an influence of a reflectance of the surface region within the combination result is reduced as compared to the influence on the first and second measurement signals; wherein the illumination means includes a line projector configured to emit the first illumination signal, and has a light source configured to emit the second illumination signal so as to illuminate the surface region in an illumination area in an essentially homogeneous manner, the illumination area being arranged such that the first illumination signal overlaps with the illumination area at least in some areas.

According to another embodiment, a method may have the steps of: emitting a first illumination signal having a first illumination intensity and a second illumination signal having a second illumination intensity in the direction of a surface region of an object to be measured, the second illumination intensity being smaller than the first illumination intensity; providing a first measurement signal based on a first reflection of the first illumination signal on the surface region, and providing a second measurement signal based on a second reflection of the second illumination signal on the surface region; evaluating the first measurement signal and the second measurement signal by combining them with each other so as to obtain a combination result from which a position of the first illumination signal on the surface region may be derived, wherein an influence of a reflectance of the surface region within the combination result is reduced as compared to the influence on the first and second measurement signals; forming a first logarithmized value on the basis of the first measurement signal and forming a second logarithmized value on the basis of the second measurement signal, so that in the first logarithmized value and in the second logarithmized value, the influence of the reflectance is an addend, so that by subtracting the second logarithmized value from the first logarithmized value in order to obtain the combination result, the influence of the reflectance will be reduced; wherein the first illumination signal and the second illumination signal have an identical wavelength range and are equally influenced, at an identical point within the surface region, by the reflectance or reflectivity of the surface region.

According to another embodiment, a method may have the steps of: emitting a first illumination signal having a first illumination intensity and a second illumination signal having a second illumination intensity in the direction of a surface region of an object to be measured, the second illumination intensity being smaller than the first illumination intensity; providing a first measurement signal based on a first reflection of the first illumination signal on the surface region, and providing a second measurement signal based on a second reflection of the second illumination signal on the surface region; evaluating the first measurement signal and the second measurement signal by combining them with each other so as to obtain a combination result from which a position of the first illumination signal on the surface region may be derived, wherein an influence of a reflectance of the surface region within the combination result is reduced as compared to the influence on the first and second measurement signals; wherein said emission of the first illumination signal is performed by using a line projector, the surface region in an illumination area having the second illumination signal is illuminated by a light source in an essentially homogeneous manner, the illumination area being arranged such that the first illumination signal overlaps with the illumination area at least in some areas.

According to another embodiment, a non-transitory digital storage medium may have a computer program stored thereon to perform the inventive methods, when said computer program is run by a computer.

The core idea of the present invention consists in having found that the above object can be achieved in that an influence of the reflectance may be reduced by dual illumination of the surface in that a first measurement signal based on a first illumination and a second measurement signal based on a second illumination are combined. By said combination, the influence of the reflectance acting on both measurement signals may be at least partly reduced or compensated for.

In accordance with an embodiment, a device includes illumination means configured to emit a first illumination signal having a first illumination intensity and a second illumination signal having a second illumination intensity in the direction of a surface region of an object to be measured, the second illumination intensity being smaller than the first illumination intensity. The device includes sensing means configured to provide a first measurement signal based on a first reflection of the first illumination signal on the surface region, and to provide a second measurement signal based on a second reflection of the second illumination signal on the surface region. The device includes evaluation means configured to combine the first measurement signal and the second measurement signal with each other so as to obtain a combination result from which a position $(x_0/y_0)$ of the first illumination signal on the surface region may be derived, wherein an influence of a reflectance of the surface region within the combination result is reduced as compared to the influence on the first and second measurement signals. What is advantageous is that the reflectance present at one location of the surface region acts, in a comparative or identical manner, on the reflection of the first illumination signal and on the reflection of the second illumination signal, so that by combining the two measurement signals obtained, said influence may be at least partly reduced or compensated for.

In accordance with an embodiment, the evaluation means is configured to form a first logarithmized value on the basis of the first measurement signal and to form a second logarithmized value on the basis of the second measurement signal, wherein in the first logarithmized value and in the second logarithmized value, the influence of the reflectance is an addend, so that by subtracting the second logarithmized value from the first logarithmized value in order to obtain the combination result, the influence of the reflectance will be reduced. What is advantageous about this is that logarithmization of the measurement signals results in an additive influence of the reflectance, so that both addends of the reflectance in the first and second measurement signals may be subtracted from each other, which represents a small amount of expenditure in terms of calculating operations.

In accordance with an embodiment, the evaluation means is configured to determine a position of the first illumination signal and/or of the second illumination signal on the surface region on the basis of the combination result. Said determination may be effected by determining the center of gravity, which may be performed with high accuracy due to the reduced influence of the reflectance.

In accordance with a further embodiment, the illumination means includes a line projector in order to emit the first illumination signal and the second illumination signal. Alternatively, the illumination means includes a line projector configured to emit the first illumination signal, and further includes a light source configured to illuminate the surface region in an illumination area in an essentially homogeneous manner, the illumination area being arranged such that the first illumination signal overlaps with the illumination area at least in some areas. The first illumination signal may be a line, whereas the second illumination signal may include homogeneous illumination and/or a line. In both cases, it is possible to consider the reflectance at the location of the first illumination signal; the former case enables utilization of a snapshot mode of the image sensor, whereas in the second case, simple illumination of the object region is possible.

In accordance with a further embodiment, the illumination means is configured, during a first measurement interval, to emit the first illumination signal, and the sensing means is configured to sense a first picture of the surface region. During a second measurement interval, the illumination means is configured to emit the second illumination signal, and wherein the sensing means is configured to sense a second picture of the surface region. The device is configured to obtain, between the first measurement interval and the second measurement interval, an essentially unchanged relative position between the illumination means, the sensing means and the surface region. This enables performing the first capturing and the second capturing in different memory cells of a pixel or in different pixels of an image sensor of the sensing means. Since the relative position is essentially unchanged, little influence on the position determining exerted by a relative movement may be obtained, which is advantageous.

In accordance with one embodiment, the evaluation means is configured to comprise a filter configured to subject the first measurement signal and the second measurement signal to a filtering operation, or to subject the combination result to a filtering operation. By filtering the measurement signals and/or the combination result, the position may be determined with high accuracy.

In accordance with an embodiment, the first illumination signal includes a line pattern extending along a row direction on the surface region. The evaluation means is configured to sense the position of the reflection on the surface region along a column direction, which is arranged perpendicularly to the row direction, for a multitude of laterally offset columns. The evaluation means comprises a plurality of filter kernels configured to subject the first measurement signal or the second measurement signal or the combination result to a filtering operation and/or to subject the combination result to a filtering operation. The filter kernels are arranged along the column direction such that they are laterally offset to each other. This enables fast processing of the measurement signals.

In accordance with an embodiment, the filter kernels are arranged at a mutual offset smaller than a distance between two adjacent columns. This enables position determining at a level of resolution that is smaller than the dimension of a pixel, i.e. a subpixel resolution.

A further embodiment provides a method. Said method includes emitting a first illumination signal having a first illumination intensity and a second illumination signal having a second illumination intensity in the direction of a surface region of an object to be measured, so that the second illumination intensity is smaller than the first illumination intensity. The method includes providing a first measurement signal based on a first reflection of the first illumination signal on the surface region, and providing a second measurement signal based on a second reflection of a second illumination signal on the surface region. The method includes evaluating the first measurement signal and the second measurement signal by combining them with each other so as to obtain a combination result from which a position of the first illumination signal on the surface region may be derived, so that an influence of a reflectance of the surface region within the combination result is reduced as compared to the influence on the first and second measurement signals.

Further embodiments provide a computer program having a program code for performing methods described herein.

BRIEF DESCRIPTION OF THE DRAWINGS

Embodiments of the present invention will be detailed subsequently referring to the appended drawings, in which:

FIG. 5b shows the operands of a convolution operation including a measurement signal of FIG. 1 and the filter of FIG. 5a in accordance with an embodiment;

FIG. 5c shows a schematic representation of the convolution result of the convolution of FIG. 5b in accordance with an embodiment;

FIGS. 9a and 9b show representations of determining a position of a laser line on a sensor matrix of an image sensor;

FIG. 12 shows a schematic comparison of various reflectances on a surface in accordance with conventional technology.

DETAILED DESCRIPTION OF THE INVENTION

Figure 1:
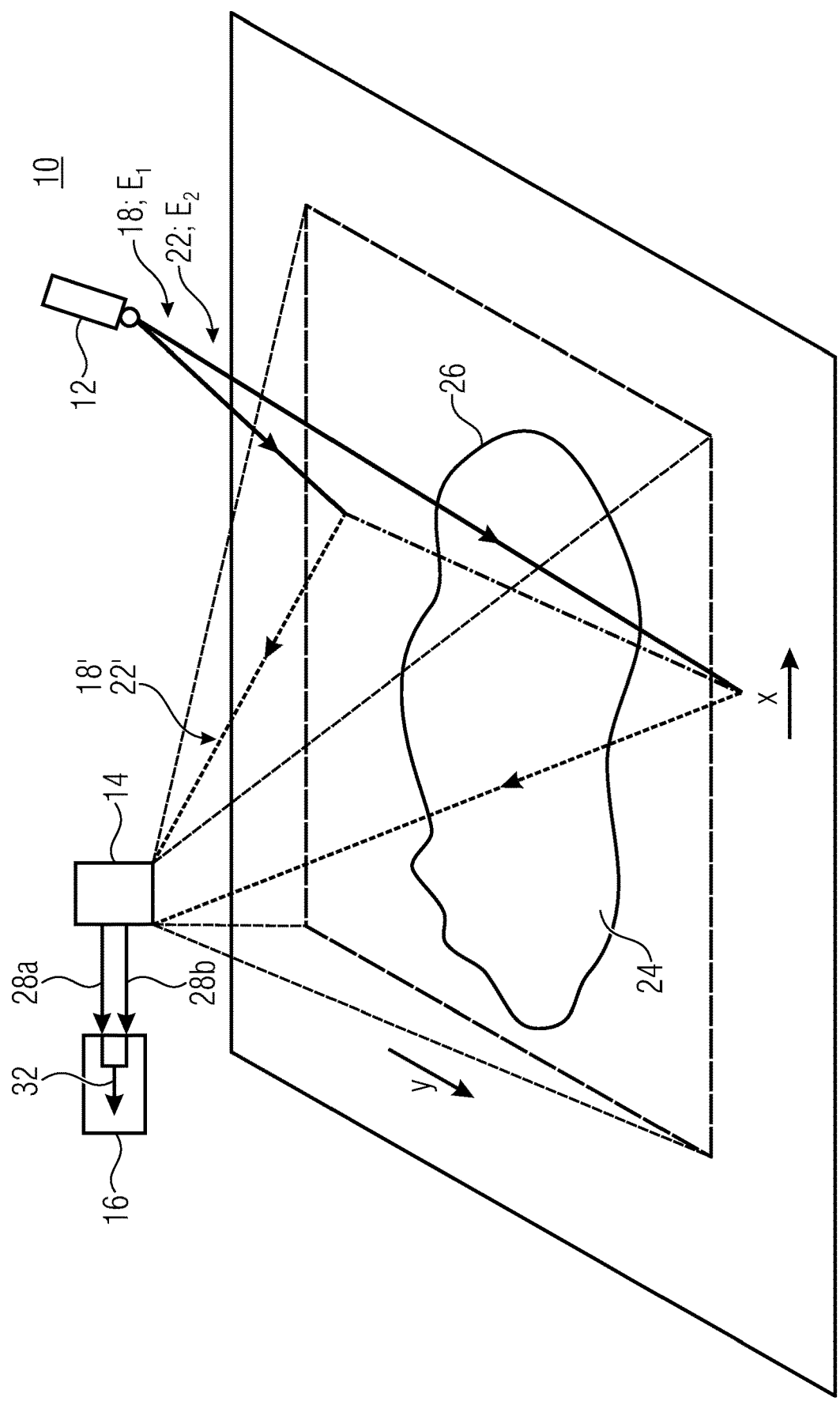
FIG. 1 shows a schematic perspective view of a device in accordance with an embodiment.

Before embodiments of the present invention will be explained in detail below with reference to the drawings, it shall be noted that elements, objects and/or structures in the various figures which are identical or identical in function or effect are designated with identical reference numerals, so that the descriptions of said elements which are presented in different embodiments are mutually exchangeable and/or mutually applicable.

FIG. 1 shows a schematic perspective view of a device 10 in accordance with an embodiment. The device 10 includes illumination means 12, sensing means 14, and evaluation means 16.

The illumination means 12 is configured to emit a first illumination signal 18 having a first illumination intensity or illumination intensity distribution $E_1$ in the direction of a surface region 24 of an object to be measured 26. The illumination means 12 further is configured to emit a second illumination signal 22 having a second illumination intensity or illumination intensity distribution $E_2$ in the direction of the surface region 24. The second illumination intensity $E_2$ is smaller than the first illumination intensity $E_1$, i.e. the illumination intensity distribution $E_2$ has, at any location relevant in terms of measurement, a smaller amount than $E_1$, and the following applies:

$$E_1 > E_2, \text{ and/or } E_1(x_0, y_0) > E_2(x_0, y_0),$$

wherein $x_0$ and $y_0$ are the locations of the illumination that are to be determined.

The illumination signals may be used in any order, as $E_2$ followed by $E_1$, as $E_1$ followed by $E_2$, or as simultaneous or temporally overlapping emission. This means that the illumination means 12 may be configured to temporarily not emit the illumination signal 22 when the illumination signal 18 is being emitted. Alternatively, the illumination means 12 may be configured to emit background illumination, e.g. the illumination signal 22, and to temporarily emit an illumination signal having a higher intensity, e.g. the illumination signal 18, so as to sense the pictures on the basis of the background illumination, for one thing, and on the basis of the light line outshining the background illumination, for another thing. The background illumination may be a light line but may just as well be planar illumination. The light line may be emitted by using a line projector, e.g. an LED line projector and/or a laser line projector, so that the line pattern may be a line produced by at least one LED and/or one laser. This means that the illumination means 12 may include a laser line projector configured to emit an illumination signal, e.g. the illumination signal 18. The illumination means 12 may further comprise a light source configured to illuminate the surface region 24 in an at least partial and, within an illumination area, in essentially homogenous manner. The illumination area may be arranged such that the illumination signal of the laser line projector overlaps with the illumination area at least in some areas. For example, the illumination area may at least partially overlap with the object region 24 but may also fully fill in or project beyond said object region 24. An illumination intensity distribution is advantageously comparatively smaller than the other illumination intensity distribution. If a planar or homogeneous illumination intensity distribution is employed in combination with a line pattern, the line pattern will exhibit the illumination intensity distribution that is comparatively larger or more pronounced than the surface-area light.

In accordance with one embodiment, the illumination means 12 is configured to emit homogenous illumination providing the illumination intensity distribution $E_2$, which means $E_2(x,y)$=constant for all x and y within the measurement range. Said homogenous illumination may be temporarily activated and deactivated or may be emitted constantly. In the event of temporary activation and deactivation, the comparison value for the reflectance may be captured on the basis of the homogenous illumination in that a large amount of the area of the surface is homogenously illuminated. The laser line, e.g. the illumination signal 18, and the planar illumination, e.g. the illumination signal 22, may be alternatingly activated. The difference from both captured images may be determined, as was described above for the laser lines originating from the same generator and having two different levels. When using constant homogenous illumination, deactivation of the planar illumination may be dispensed with. On the one hand, this will simplify control, but on the other hand, it will involve selecting a suitable illumination level or radiation intensity, which at any location of the laser light line has to be clearly smaller than the laser line. For example, homogenous illumination may amount to a maximum of 80%, to a maximum of 50% or to a maximum of 20% of the intensity of the laser light line.

Reflections 18' and 22' of the illumination signals 18 and 22 which are reflected by the surface region 24 may be sensed by the sensing means 14. To this end, the sensing means 14 may be configured, e.g., to provide a planar image or reproduction of the surface region 24 or a processed version of such an image. For example, the sensing means 14 may be or include a surface-area camera and/or a light section camera. Alternatively, it is possible to only provide information about the positions of the surface region 24 where a higher illumination intensity as compared to other regions has been sensed. To this end, the sensing means 14 is configured, for example, to provide measurement signals 28a and 28b based on the reflections 18' and 22'. The measurement signal 28a may be based on the reflection 18', whereas the measurement signal 28b may be based on the reflection 22'. This means that the measurement signal 28a may be associated with the reflection 18' and/or the illumination signal 18, and that the measurement signal 28b may be associated with the reflection 22' and/or the illumination signal 22.

The evaluation means 16 is configured to receive the measurement signals 28a and 28b. The evaluation means 16 is further configured to combine the measurement signals 28a and 28b with each other. The evaluation means 16 is configured to obtain, as a result of the combination, a combination result 32 from which a position of the illumination signal 18 and/or of the illumination signal 22 on the surface region 24 may be derived. An influence of a reflectance of the surface region 24 is reduced in the combination result 32 as compared to the influence on the measurement signals 18 and 22 and/or on the reflections thereof. The evaluation means 16 may be designed, for example, as a field-programmable gate array (FPGA), as a microcontroller, as a CPU or as a different programmable hardware unit. The sensing means 14 and the evaluation means 16 may be means which are different from each other but may also be formed by a shared circuit or a shared logic. As described by means of FIGS. 9a and 9b, the evaluation means 16 may be configured to determine the position of the reflection of the illumination signal 18 on the surface region 24 along the column direction x for a multitude of laterally offset columns on the basis of the illumination signal 18 which is emitted as a line pattern and is mapped onto the image sensor along a row direction y. Each of the determined positions along the y direction may be associated with a pixel position on an image sensed by the image sensing device 14.

It has been found that both reflections 18' and 22' are comparably or equally influenced by the reflectance in relation to the same position in the surface region 24. This means that, e.g., in the event of an identical wavelength range of the signals 18 and 22 at an identical point in the surface region 24, both signals 18 and 22 are equally influenced by the reflectance or reflectivity of the surface region 24. This may be understood as an aberration or error in the reflections 18' and 22'. By combining the measurement signals 28a and 28b, which are based on the reflections 18' and 22', to form the combination result 32, said identical or comparable influence of the reflectance may be at least partially compensated for, so that the combination result 32 will exhibit a small or no disturbance caused by the reflectance, so that determining of the position of the illumination signal 18 and/or 22 in the surface region 24 is possible with small errors and, therefore, with high precision.

When considering the above formula $$S_l = \log\left(\frac{RE}{K}\right),$$

one will find that this result may also be presented as $$S_l = \log\left(\frac{RE}{K}\right) = \log\left(\frac{E}{K}\right) + \log(R),$$

wherein the influence of the reflectance R may be regarded as a constant offset. Said offset is dependent on the used intensity E to a small degree only, or is completely independent thereof, and may therefore be calculated separately when several illumination sources are used.

Particularly advantageous implementations of the combination of the measurement signals 28a and 28b will be explained below. The evaluation means 16 may be configured to derive a logarithmized value from the measurement signals 28a and 28b, respectively. A logarithmized value, which is obtained by the evaluation means 16 from the measurement signal 28a, may be presented by $$S_{l,1} = \log\left(\frac{E_1}{K}\right) + \log(R),$$

for example, whereas a logarithmized value derived from the measurement signal 28b may be presented as $$S_{l,2} = \log\left(\frac{E_2}{K}\right) + \log(R).$$

It has turned out that the error-inducing term log (R) may be the same for both illumination signals. It is possible, but not necessary, for the evaluation means 16 to calculate the individual components of the logarithmized values $S_{l,1}$ and $S_{l,2}$. It is possible for the evaluation means 16 to apply a logarithm having the basis 2, 5, 10 or any other value to the measurement values obtained. Subtraction of the values enables neutralization of the reflectance even without breaking down the individual terms.

The evaluation means 16 may be configured to subtract the logarithmized values $S_{l,1}$ and $S_{l,2}$ from each other so as to perform the combining, e.g. in accordance with the following approach:

$$S_1 - S_{l,2} = \log\left(\frac{E_1}{K}\right) - \log\left(\frac{E_2}{K}\right) + \log(R) - \log(R).$$

This means that within the difference value obtained, the influence of the reflectance may have been compensated for. The influence of the reflectance R may be fully compensated for by said subtraction at least in mathematical terms, so that the actual influence of the reflectance R may be able to be compensated for up to measurement inaccuracies and/or calculation inaccuracies.

By rearranging the logarithmic terms, the combination result 32 may be obtained in a quantity designated by $S_{l,tot}$ $$S_{l,tot} = \log\left(\frac{E_1}{E_2}\right).$$

This means that the evaluation means may be configured to form the logarithmized value $S_{l,1}$ on the basis of the measurement signal 28a and to form the logarithmized value $S_{l,2}$ on the basis of the measurement signal 28b. In the logarithmized value $S_{l,1}$ and in the second logarithmized value $S_{l,2}$, the influence of the reflectance is an addend. By subtracting the second logarithmized value $S_{l,2}$ from the logarithmized value $S_{l,1}$ for obtaining the combination result 32, e.g. the value $S_{l,tot}$, the influence of the reflectance may be reduced or compensated for. Even though the logarithmized values $S_{l,1}$ and $S_{l,2}$ are described to exhibit the reflectance $E_1$ and $E_2$ in the ratio $E_1 > E_2$, the intensity ratios may also be swapped, so that $E_2 > E_1$ applies. Since the logarithmized values of the reflectance, which means the term log (R), are unchanged in both terms, this does not change the compensation for the reflectance.

Even though the evaluation means 16 may be configured to combine the measurement signals 28a and 28b to each other in a different manner, for example by means of a division and/or any other mathematical operations in relation to the measurement signals 28a and 28b, logarithmization offers advantages since subtraction of the logarithmized values may be implemented with less computation expenditure and, as compared to multiplications or divisions, with less hardware expenditure.

In other words, the reflectance R plays no part in the combination result 32. The combination result 32 may be used by the evaluation means 16 for determining the position(s) of the illumination signal 18 and/or 22 on the surface region 24 and/or may be made available to a different device for performing such an evaluation. In order to compensate for the reflectance, the surface in the surface-area element observed, the surface region 24, may be illuminated with two different intensities of the irradiation level, a larger one, e.g. $E_1$, and a smaller one $E_2$. Subtraction of the resulting signal values for the logarithmic response may provide the above-described result when the proportionality factor is otherwise the same. It may be assumed that the ratio $E_1/E_2$ at illuminated locations is larger than the value 1, and that the logarithmic difference $S_{l,tot}$ is significantly larger than at non-illuminated locations of the surface region 24. For the selection of the distributions of the values of the two intensities $E_1$ and $E_2$, different interpretations may be implemented which will be explained below in detail.

The normalization quantity K may express correction values of the hardware or the like that is used and may be identical for both illumination signals and reflected portions. If the normalization quantities K are different in both signal portions, this may be taken into account by corresponding correction factors.

The position of the illumination signal 18 and/or 22 on the surface region 24 may be derived from the combination result 32 e.g. by determining a leap of the progress of the values. For this purpose, the combination result 32 may be used. This means that instead of an evaluation performed by means of one single measurement signal, an identical or comparable evaluation may be performed on the combination result. In order to obtain suitable reflected illuminations, it is sufficient for both intensities $E_1$ and $E_2$ to be present within the region in which the position is to be established. This may take place at the same time or with a mutual time offset. For example, if the position of the illumination signal 18 is to be determined, it will be sufficient for the second illumination signal to be also reflected at this location. Determining a position with regard to the second illumination signal may be dispensed with. For this purpose, surface-area illumination, e.g. background illumination, or any other type of illumination may be used. If the one illumination signal to be established is a laser light line, for example, the other illumination signal may also be a laser light line, as an alternative to the surface-area illumination.

The illumination means 12 may include one single light source configured to sequentially emit the illumination signals 18 and 22 one after the other with different intensities. Alternatively, the illumination means 12 may include at least first and second signal sources configured to emit the first and second illumination signals 18 and 22 at the same time or with a mutual time offset.

In accordance with an embodiment, the illumination means 12 is configured to emit the illumination radiations 18 and 22 as a laser light line, respectively, comprising two mutually different intensity levels $E_1$ and $E_2$. This means that the illumination means may be configured to emit a laser line as an illumination signal 18 and/or 22. The illumination means may further be configured to emit such a laser line as a top-hat distribution or including a Gaussian distribution. A top-hat distribution will be described in connection with FIG. 2. The illumination means may be formed as a generator for generating two mutually different laser lines having two different levels. The laser light lines may comprise an identical characteristic, e.g. in terms of the wavelength, of a dimension of the line on the object 26 or the like. In this implementation, a constant value, which is highly suitable for evaluation, theoretically results for the differences between the logarithmized values. It is advantageous for the smaller one of the two intensities $E_1$ and $E_2$ to be employed for establishing the transient behavior, and if the difference between the logarithmized values establishes the resulting signal amplitude—and, thus, the signal-to-noise ratio of the combination result 32. The transient behavior may be established, for example, in that the illumination signal having the smaller intensity is emitted or sensed temporally before the illumination signal having the comparatively higher intensity. What is advantageous about this implementation is that utilization of a snapshot mode of an image sensor of the sensing means 14 is enabled, so that brightness distributions of the projection on the image sensor may be effected at short time intervals. The resulting signals 28a and 28b may be stored or buffered and thereafter be read out and/or processed in a second step. Said step may be performed without delaying the measurement method, even if the evaluation takes a relatively long time, which is enabled by the buffering of the measurement signals 28a and 28b. Since the calculation possibly takes a relatively long time, occurrence of movement artifacts may be avoided.

The sensing means 14 may comprise an image sensor. Said image sensor may comprise a first memory cell and a second memory cell for sensing a pixel of the respective picture taken of the surface region for sensing the reflection 18' and for sensing the reflection 22'. Each of said memory cells of a pixel may be configured to store light information concerning the respective picture. This means that a first memory cell of the pixel may be configured to store light information regarding the picture of the reflection 18', and that a second memory cell of the pixel is configured to store light information regarding the picture of the reflection 22'. Alternatively or additionally, it is also possible for the image sensor uses, for sensing a pixel of the picture of the reflection 18' and 22', a memory cell in each case which is associated with one pixel, respectively, which means that a first pixel comprises a first memory cell and that a second pixel comprises a second memory cell. The different memory cells are configured to store light information regarding the different pictures. The two memory cells of the different pixels may be electrically or optically coupled to each other, so that captured image signals are identical within the first and second memory cells.

In other words, storage may be performed in two memory cells of a pixel or in both memory cells of adjacent pixels. In this context it is convenient, when storing takes place in two different pixel cells, to electrically or optically couple same such that the captured image signal is identical, so that aliasing effects may be avoided. If coupling of the optical and/or electric pixel values during storage into the two memory cells is not possible, the embodiments described herein may nevertheless be used. In the case of two different pixels, for example, the amplified values or of the values transferred to a different domain by means of binning or charge-based convolution into groups may be combined in order to reduce the aliasing effects. Transfer to a different domain may be understood to mean, for example, transfer of the charge contained within the memory cells to a voltage, to a current or to a different charge. Implementation of charge-based convolution is described, e.g., in US 2011/0062314 A, JP 2009-0550293 T or KR 101222942 B1.

During readout by means of snapshot, the corresponding pixels may be output, and differences may be formed from one or more pairs with the two stored items of brightness information. This may be effected, e.g. on the readout line, in an analog manner and by means of positive and negative currents or charges within the receiver, e.g. a differential charge transimpedance amplifier (charges/currents) or operational amplifiers (voltages) and/or may be effected following analog-to-digital conversion by way of calculation within the digital domain.

As an alternative to storage by means of snapshot, implementations are provided which employ a so called rolling-shutter method instead of the snapshot method. This may be particularly advantageous for utilization with image sensors having very fast tripping circuits, having synchronous control of the illumination signals, and/or for observation of relatively slow processes. Here it may be advantageous or important for movement artifacts to be avoided. This may be achieved in that the movement in time during both sampling times is either small or in that the two readout and storage positions are suitably tracked along each sensor column. This means that the device 10 may be configured, during a first measurement interval, emit one of the illumination signals 18 and 22 and to produce a first picture of the surface region on the basis of the illumination signal emitted. During a second measurement interval, the device 10 may be configured to emit the second one of the illumination signals 18 and 22 and to produce a second picture of the surface region. In between the measurement intervals, the device 10 may be configured to obtain an essentially unchanged relative position between the illumination means 12, the sensing means 14 and the surface region 24. For this purpose, the device 10 may comprise an actuator configured to maintain the relative position essentially unchanged by means of a movement of the sensing means 14 as a function of a movement of the surface region 24 in relation to the device 10 and/or to the illumination means 12. Essentially unchanged here means that a movement may occur which distorts the results by a maximum of 30%, by a maximum of 20% or by a maximum of 10%. What is advantageous is a standstill, i.e. complete maintenance of the relative position. However, small changes in the relative position may also be tolerable.

A rolling-shutter readout may be effected by initially projecting the first intensity and storing it on the image sensor and then further projecting the second intensity during readout. Under said conditions, both values might then be corrected so as to output the movement which has taken place in the meantime, and the difference will be determined. The formation of the difference may be effected in the same manner as in the snapshot mode, except for the location/time relationships of the rolling-shutter mode.

Figure 2:
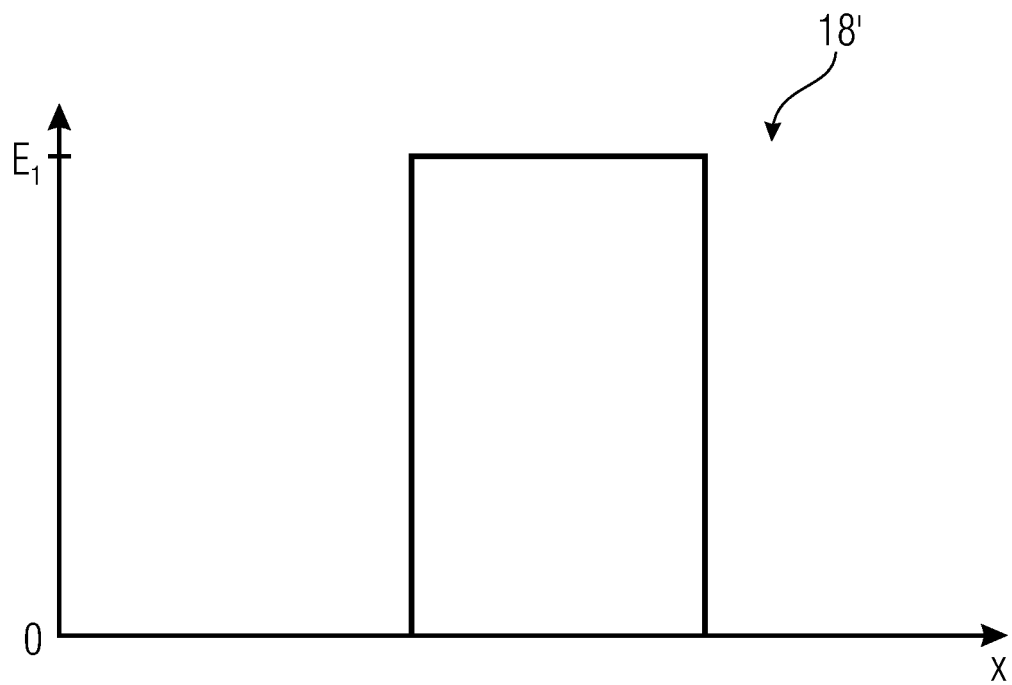
FIG. 2 shows a schematic diagram of an intensity distribution of a reflected illumination signal in accordance with an embodiment.

FIG. 2 shows a schematic diagram of an intensity distribution of the reflection 18' of the illumination signal 18 perpendicularly along the x direction, i.e. perpendicularly to the y direction. Across the area of the line, i.e. the line width, the reflection 18' may exhibit an essentially constant level of brightness, i.e. an essentially constant level of intensity. This may also be referred to as a top-hat configuration and/or as comprising steep edges. The implementations are readily transferable to the illumination signal 22, for example when the illumination signal 22 is emitted as a laser light line. The intensity distribution shown depicts, by way of example, a width of the laser line, it being possible to arrange, along the width, signal edges which are as steep as possible and are approximated to a perpendicular edge. The intensity $E_1$ is emitted in the style of a top hat.

The depicted illumination intensity or illumination intensity distribution $E_1$ here relates to a global maximum of the intensity distribution across the line width. More planar edges or a narrower plateau may result in that a different intensity distribution is obtained, said intensity distribution also comprising a local or global maximum. The designated intensities $E_1$ and $E_2$ of the illumination signals 18 and 22 may thus be global maxima of the respective intensity distributions.

If the width of the laser line is determined by comparison with a constant threshold, the corresponding established value of the width may vary at different intensities, both in the linear and in the logarithmic readout modes. It may possibly be irrelevant whether the threshold is predefined externally or whether it results from the background signal, i.e. from a level of the non-illuminated surface or a dark signal. The larger the level, the wider the line.

Different detected line widths may result, during formation of the difference, in superelevations in the rim area of the lines. This may result in that the assumption of full compensation for the reflectance terms is no longer fully accurate and that the advantageous approach of the difference formation illustrated there is no longer constructive. This problem may be minimized by employing a laser line comprising a constant brightness profile, i.e. a top-hat distribution.

Due to the steep rise at the rim areas, the depicted line width may vary to a small degree, or with very small intensity, as a function of the steepness, as intensity varies. This enables more simple and more precise evaluation.

For reading out the image date and/or for localizing the laser line within the object region 24, the evaluation means 16 or a device to which the combination result 32 is provided, may perform filtering of the respective signals. For example, the signals 28a and 28b may be filtered by the evaluation means 16. This may also be effected as early as in the sensing means 14, which means that the evaluation means 16 may at least partially be part of the sensing means 14. Filtering of the measurement signals 28a and 28b may make use of the fact that during readout in one or more lines of the images, the pixel values may be multiplied by a digital value, e.g. via the charge-pulse width of the output current or pulse number. For signed multiplication, the memory, e.g. an SI (switched current) cell, may be employed when a current output is used, or one of the two output lines may be employed in the event of a differential output. Thus, one or more filtering operations may be performed as early as prior to the analog-to-digital conversion. The evaluation means 16 may thus comprise a filter configured to subject the measurement signal 28a and/or the measurement signal 28b to a filtering operation. Alternatively or additionally, the evaluation means 16 may be configured to subject the combination result 32 to a filtering operation. To this end, filters of the evaluation means 16 may comprise filter kernels. The latter may be configured to perform row-by-row multiplication for a convolution, i.e. for noise suppression and/or for band-pass filtering and/or for employing a low pass for noise suppression and/or for employing a high pass for detecting the position of the edge. The kernels may be formed symmetrically or asymmetrically in relation to the midperpendicular in the y direction. An example of a symmetrical kernel is the so called "Mexican hat" depicted in FIG. 3c. This means that the evaluation means 16 may be configured to obtain a filtering result on the basis of the filtering operation and to derive, from the filtering result, the position of the first illumination signal on the surface region and/or to derive the position of the projection of the first illumination signal on the surface of the object to be measured.

The evaluation means may be configured to compare the filtering result with a threshold value so as to derive the position of the illumination signal 18. Embodiments enable fast scanning of the entire image field, i.e. of the sensing area of the sensing means 14, with reduced resolution. Filters may combine several pixels into one aggregate signal. Thus, it is possible to scan the entire image matrix in a few steps by using filter kernels which are of a corresponding width, i.e. include several pixels. Nevertheless, all of the pixels are considered, and optical aliasing is avoided in that cells are skipped. Said method is not possible with known image sensors since they can output only one row at a time. By using the coarse scan, the area which is actually of interest, i.e. the area wherein the laser line is arranged with a high probability of at least 95%, at least 98% or at least 99%, may be determined very fast so as to subsequently perform a sensitive scan on a reduced cutout of the image field. This means that the evaluation means 16 may be configured to perform, in a first step, a coarse scan with low resolution amounting to a factor of a maximum of 0.6, of a maximum of 0.4 or of a maximum of 0.2 of the possible resolution of the image sensor, so as to determine an area wherein the existence of the laser line is presumed, and to perform, in a second step, a fine-scanning operation with a comparatively higher level of resolution in this area.

In accordance with embodiments, the evaluation means 16 is configured to perform the coarse scan so as to evaluate the measurement signals 28a and 28b which are based on an image having a high dynamic range (on an HDR image). For performing such an HDR algorithm, the evaluation means may be configured to form, in one pixel each, the difference from two signals having different illumination intensities. However, if subsequently, a filter kernel with positive and negative coefficients is to be employed, the difference signal may be output in a positive and negative manner. In other words, a fundamental idea is based on that in the event of two stored values (for $E_1$ and $E_2$) or for adjacent pixels, wherein $E_1$ is stored in one pixel and $E_2$ is stored in the other pixel, calculation (i.e. row-wise multiplying and column-wise output of the products) is effected in one pixel, which may be performed, e.g. by means of the Mexican-hat filter. Inversion of the sign may be effected, in the pixel, e.g. by current mirrors, an SI cell (current signal) and by reversing the polarity of capacitors (voltage signal) and/or by outputting on two different lines (differential architecture). In this context, one line is considered a positive summing line, and the other one is considered a negative summing line. It is also possible to perform sequential output, i.e. to output first one polarity and then the other polarity. This is followed by the evaluation in the evaluation circuit. This is simple to realize with differential architecture. With non-differential architecture, however, at least the positive differential signal or the negative differential signal may be available, depending on which term is subtracted from which. A solution may be implemented, in the evaluation means, in that the negative and positive portions of the filter are output one after the other, inversion of the negative portion being achievable by so called polarity reversal of a storage capacitor. A further solution may be implemented by using a conventional filter, e.g. a Mexican hat, wherein the positive and negative portions were accommodated in different illumination intensities. At its center, the Mexican hat comprises a positive term, and next to that on the left and on the right, it comprises a negative term in each case. Embodiments are configured to utilize, i.e. to process, the one kind of pixel values for the central area (principal maximum: positive area), and to utilize, i.e. to process, the other kind of pixel values for the outer area (first additional maxima: negative area). For this purpose, in differential readout, the results may be output only to the one or the other output line in each row. This saves expenditure or time but exhibits a certain error (this is why mention is made of approximation). Alternatively, it would be possible to apply the same Mexican hat twice, but with different signs, to the pixel values stored for $E_1$ and $E_2$. The latter method, i.e. recording of positive and negative portions with different illumination intensities, may initially provide an approximation of the HDR algorithm and may at least partly suppress the broad variations of the laser line at reflectance leaps.

Figure 3A:
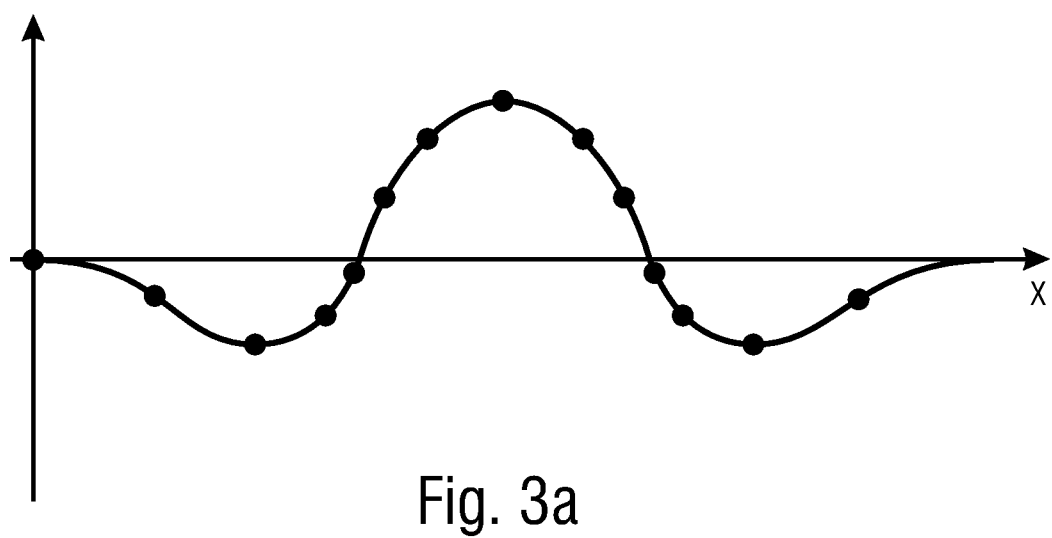
FIG. 3a shows a schematic diagram of a symmetrical convolution kernel implementing a so called Mexican hat, in accordance with an embodiment.

The filtering operation applied to at least one of the measurement signals or to the combination result may comprise convolution of the first measurement signal and of the second measurement signal or convolution of the combination result with a convolution kernel or a filter kernel which implements a course of the function. Examples of a symmetrical convolution kernel are, for example, a so called Mexican hat which is depicted in FIG. 3a and corresponds to an si function (sin(x)/(x)). The si function may be shifted on the x axis. An si(x) function may comprise a principal maximum or a number of additional maxima. For example, a number of two additional maxima may be arranged. The x axis relates to a number to be evaluated of an image line, whereas Y is a factor of convolution.

Figure 3B:
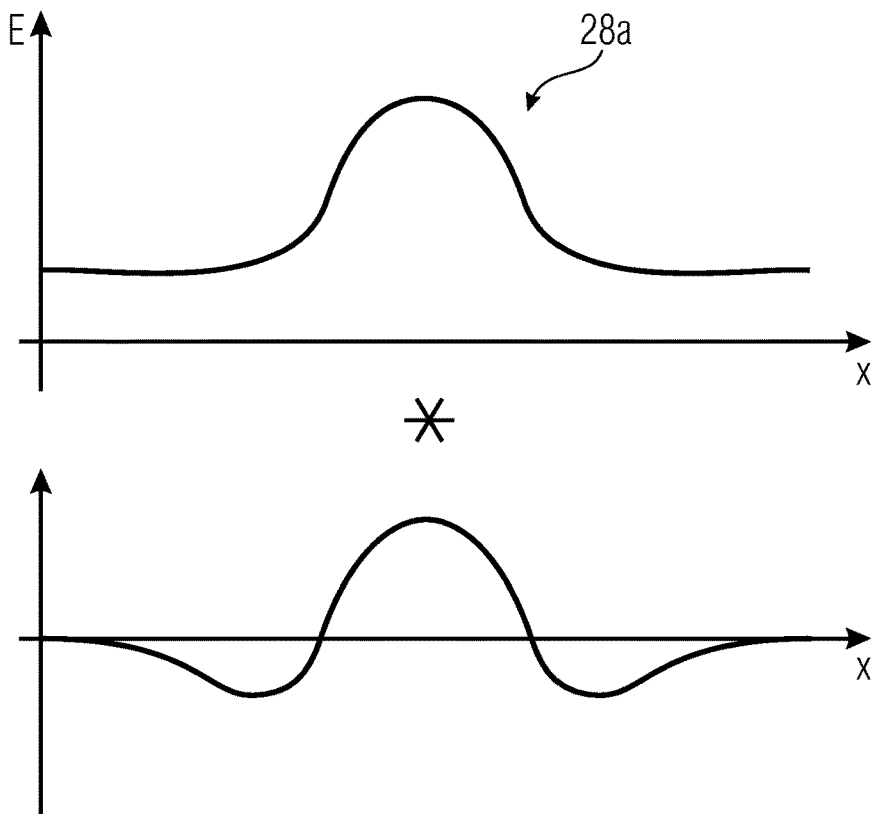
FIG. 3b shows a schematic representation of a signal, convoluted with the convolution kernel of FIG. 3a, in accordance with an embodiment.

FIG. 3b schematically shows a depiction of the mutually convoluted signals 28a and of the Mexican hat of FIG. 3a.

Figure 3C:
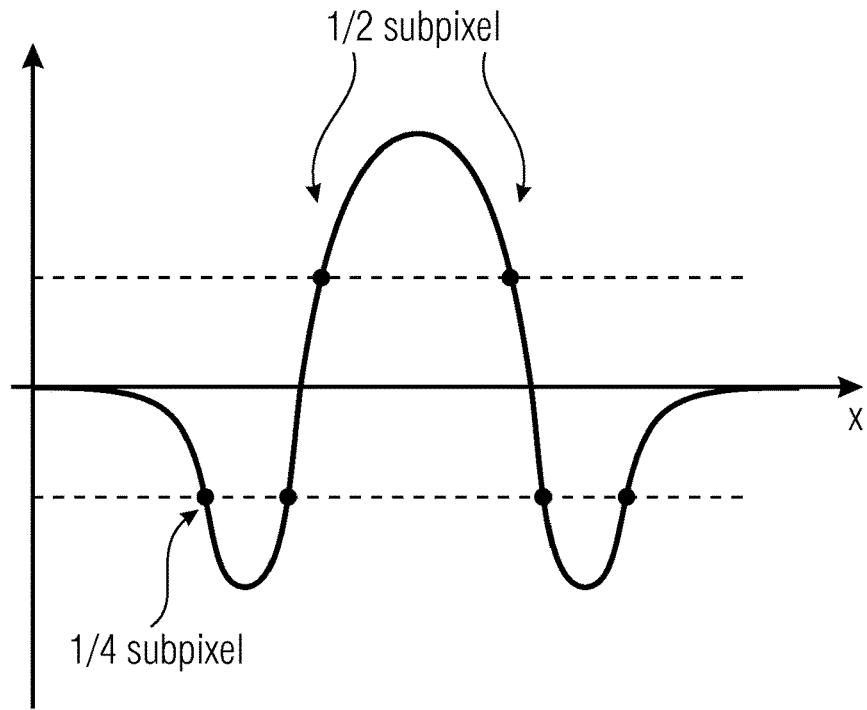
FIG. 3c shows a schematic representation of the convolution result of the two convoluted signals of FIG. 3b in accordance with an embodiment.

FIG. 3c schematically shows a representation of the convolution result of the two convoluted signals from FIG. 3b. A number of those X positions where a zero crossing was detected is designated by ¼ and ½. Said positions may be employed, while also using the known form of the convolution kernel, for determining the center in FIG. 3c, i.e. the center of the laser line. In the simplest case, the average may be employed in the event of a symmetrical convolution kernel. A weighted average is also provided in embodiments. One goal may therefore be to use as few thresholds as possible.

This enables that only threshold values for one of the signs, i.e. positive or negative, are to be established or may be used, for example when no zero crossing takes place in this area. This is depicted, e.g., in FIG. 3c for the area of ½ subpixel for a positive sign and for ¼ subpixel for a negative sign. What is advantageous about this is that such a calculation may be effected in a very simple manner.

Alternatively, an asymmetrical convolution kernel may be used. This may indeed involve defining of a positive threshold and of a negative threshold but may possibly be easier to evaluate, in particular if one is to distinguish between the slopes of different signs. Even if this is slightly more complex to implement, it enables performing detailed evaluation. Embodiments enable utilization of different digital coefficients, e.g. in connection with a genuine analog Mexican hat as depicted in FIG. 3a. This enables defining a pulse number and/or a pulse width and/or a sign independently of one another. The sign may be obtained by means of a differential output, by means of an inversion, by means of an SI cell and/or in a charge-based manner by reversing the polarity of capacitances.

Figure 4:
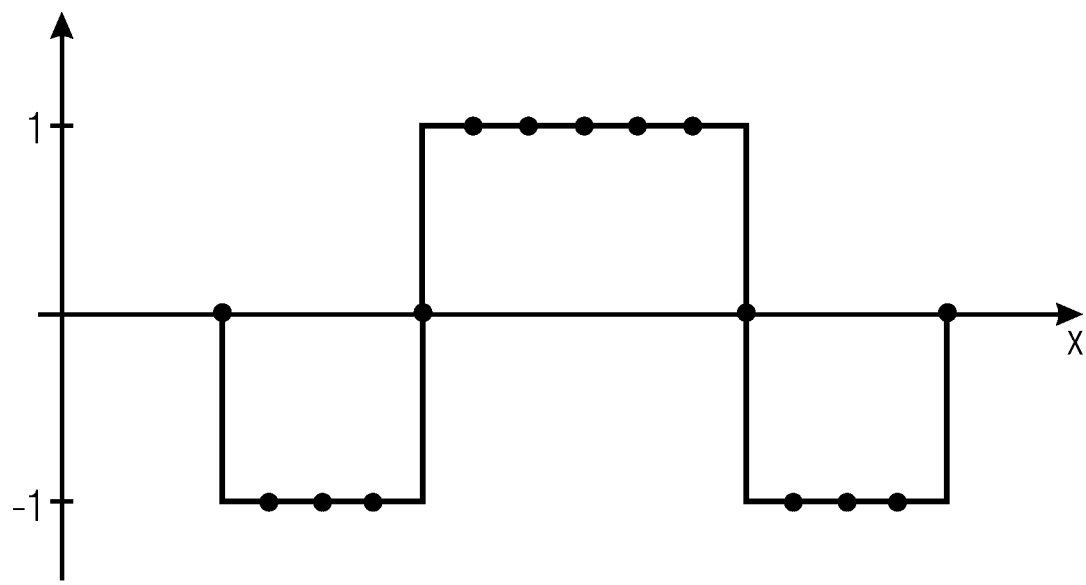
FIG. 4 shows a schematic representation of a filter which may comprise, portion by portion, merely positive or merely negative values, in accordance with an embodiment.

FIG. 4 shows a schematic representation of a filter which may comprise, portion by portion, merely positive or merely negative values so as to obtain a so called simplified digital Mexican hat. Said Mexican hat enables simple implementation of the control. In the case of the present sensor, pixel cells comprising charge-based output and column-wise summation may be employed. The approach depicted is not tied to HDR but is an advantageous application of charge-based output.

Figure 5A:
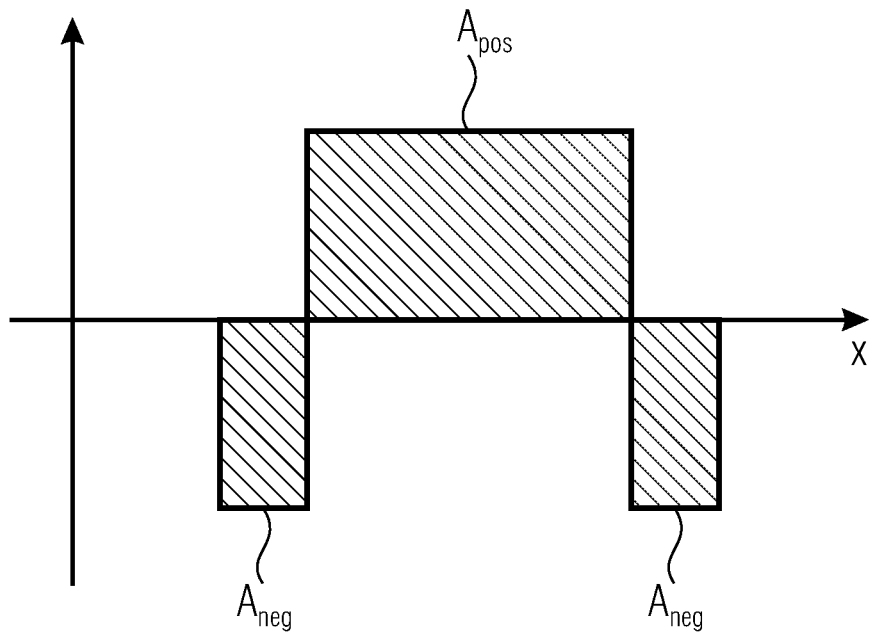
FIG. 5a shows a schematic representation of a filter comprising positive portions and negative portions, in accordance with an embodiment.

Moreover, filtering may be performed in that one or more of the above-mentioned filters are configured to be free from average values, which means that in the event of a constant progress of signals being input into a filter, a zero-numbered convolution result is obtained. This is illustrated by way of example by means of FIGS. 5a to 5c. FIG. 5a shows a schematic representation of a filter comprising positive portions designated by a $A_{pos}$, and negative portions designated by $A_{neg}$. The positive faces $A_{pos}$ of the filter characteristic may be larger than the negative faces $A_{neg}$, in terms of surface area.

FIG. 5b shows the operands of the convolution operation, the measurement signal 28a and the filter in accordance with FIG. 5a, as may be performed, e.g., by the evaluation means 16.

FIG. 5c shows a schematic representation of the convolution result of the convolution of FIG. 5b.

This may be implemented as a standard variant and may lead to a comparison of the result with 0. One problem herein may consist in that, generally, many zero crossings are obtained through random processes, i.e. noise, in particular on highly reflecting surfaces, which may entail an additional increase in the noise floor. The comparison with 0 may be understood to mean that zero points 42a to 42d in the convolution result may be used as threshold values.

In addition, the convolution kernels may be implemented such that they are not free from average values, i.e. they may have additional offsets. This enables automatic generation of a dynamic threshold value adapted to the signal levels of the pixels involved, reliable detection in dimly or heavily illuminated scenes, and/or simple selection of a threshold designed to be low enough for a weak signal, i.e. a laser line on a dark background, will be reliably recognized. The selection of the threshold may also be a requirement criterion associated with the reliability of the system.

Column-wise outputting of the sums from several rows may be followed by an evaluation. Said evaluation may be performed within the evaluation means 16 and/or within a device which obtains the combination result 32. Evaluation may be manifold. For example, evaluation may be effected by means of analog-to-digital conversion and/or an evaluation by means of thresholding. The former, i.e. evaluation by means of analog-to-digital conversion, may enable, for example by means of interpolation, a high level of subpixel accuracy for determining the position of the laser line. However, evaluation by means of analog-to-digital conversion may result in an increase in the implementation expenditure and, therefore, in a reduction of the speed.

Figure 6:
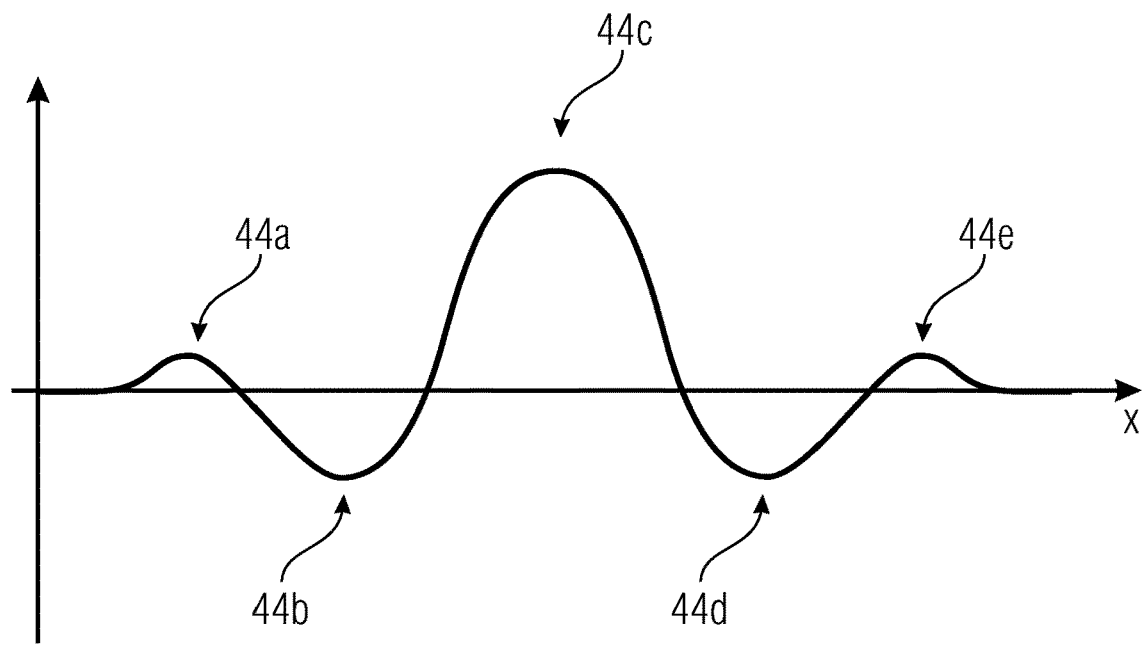
FIG. 6 shows a schematic representation of a filter characteristic comprising four additional maxima in accordance with an embodiment.

If evaluation by means of thresholding is used, the value per threshold may be limited to ½ subpixel in the event of two increases per peak, and/or ¼ subpixel in the event of four increases per peak, for example with a simple Mexican hat, for an evaluation of the outer extremes. Each additionally evaluated extreme may supply two further points of support, which results in a linear increase in the resolution in each case, for example with Mexican hats having more than three extremes of the kernel. This is depicted by way of example by FIG. 6, which shows the characteristic of a convolution kernel having five extremes 44a to 44e, which may be described, e.g., as a Mexican hat having five extremes. For example, the filter characteristic of FIG. 6 may comprise a number of four additional maxima. Other configurations having a different, advantageously odd number of extremes may also be implemented.

Evaluation by means of thresholding may be performed in different ways, e.g. by outputting a comparison with a reference voltage, a comparison with a zero point or zero crossing and/or, in particular with charge-based evaluations, by means of column-wise output of comparison charges and a comparison with a defined threshold.

Figure 7:
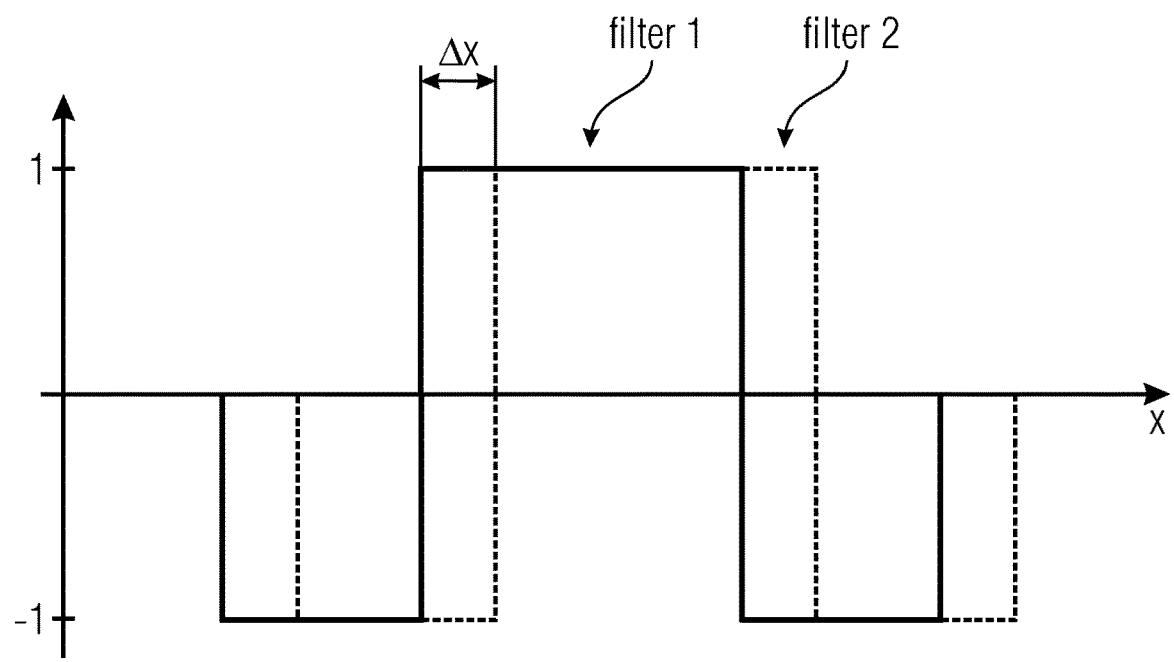
FIG. 7 shows a schematic representation of a shift, that is accurate at the level of subpixels, of a filter kernel by controlling at least two filter kernels in accordance with an embodiment.

To increase accuracy while maintaining the approach, e.g. in thresholding with any filter kernels, embodiments provide an arrangement for outputting several locally offset filter kernels, whose contribution to the aggregate signal is varied, e.g. by means of pulse width modulation. For example, a shift of the filter kernel, which is precise at the level of subpixels and is depicted by means of FIG. 7, e.g. by means of PWM control, may be effected. For doubling the resolution, e.g. along the y direction, intermediate steps may be introduced, wherein the aggregate signal may be composed of a row i in an amount of 50% and of an adjacent row i+1 in an amount of 50%. The resulting signal may correspond to a mathematical i+0.5. With charge-based output from the image sensor, the portions may be very easily controlled over the output time of the filter in each row. The method is not restricted to multiples of 2 but may be applied with any number of intermediate steps, i.e. it is also possible to increase the resolution in a manner other than doubling. The readout time with an identical number of pixels is possibly prolonged by the factor of the intermediate steps in this method, which may be tolerated, however, with a view to the gain in accuracy. The filters may be implemented as desired, therefore also as (binarized) splitting functions or the like. One particularity consists in that during the multiplication (convolution), after a certain amount of time, e.g. after half the output time, the convolution kernel will be shifted by one row. With regard to the pixels of each row, this results in pulse width modulation (PWM).

The illumination signal may include a line pattern extending along the row direction y on the surface region 24. The evaluation means 16 may be configured to sense the position of the reflection of the illumination signal 18 on the surface region 24 along the column direction x, which is arranged perpendicularly to the direction y, for a multitude of laterally offset columns. The evaluation means 16 may comprise a plurality of filter kernels configured to subject the measurement signal 28a and/or the measurement signal 28b and/or the combination result 32 to a filtering operation. The plurality of filter kernels are arranged, such that they are laterally offset to each other, at a distance $\Delta x$ along the column direction x. The offset $\Delta x$ may be smaller than a distance between two adjacent columns on the image sensor.

Figure 8A:
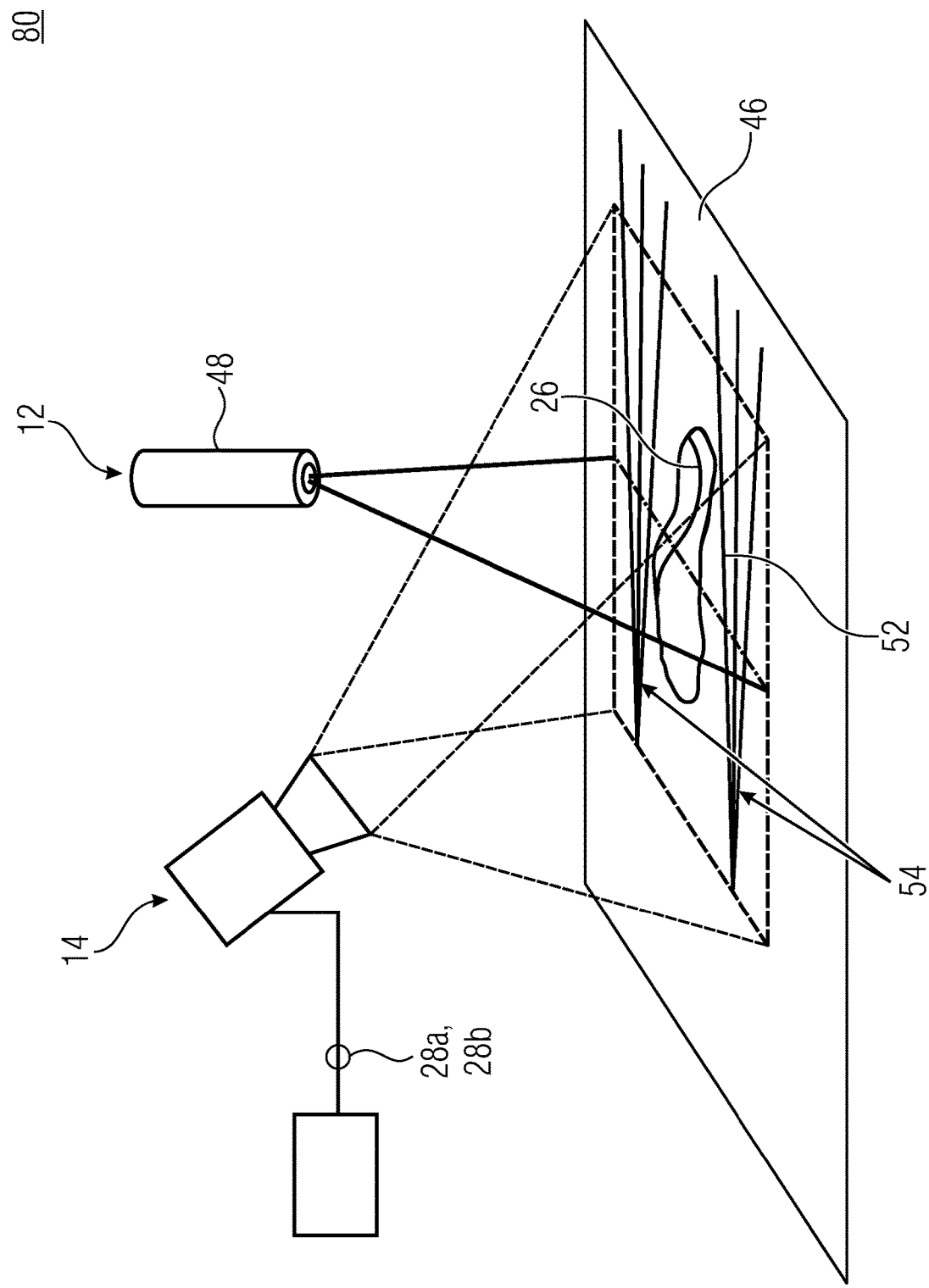
FIG. 8a shows a schematic perspective view of a device in accordance with an embodiment, wherein the object to be measured is arranged on a carrier having optional position marks.

FIG. 8a shows a schematic perspective view of a device 80 in accordance with an embodiment. The object to be measured 26 may be arranged on a carrier or a support 46, e.g. on a measuring table or a movable rest. The illumination means 12 may include one or more laser line generators or projectors 48 configured to emit the illumination signals 18 and 22 so as to project a laser line 52 having different intensities onto the object region and, thus, onto the object to be measured 26. Alternatively, the illumination signals 18 and 22 may be generated by using two different projectors. The carrier 46 may have markings 54 arranged thereon which enable localization and/or identification of the object 26. The sensing means 14 may be configured as a surface-area camera for planar sensing of the carrier 46.

Figure 8B:
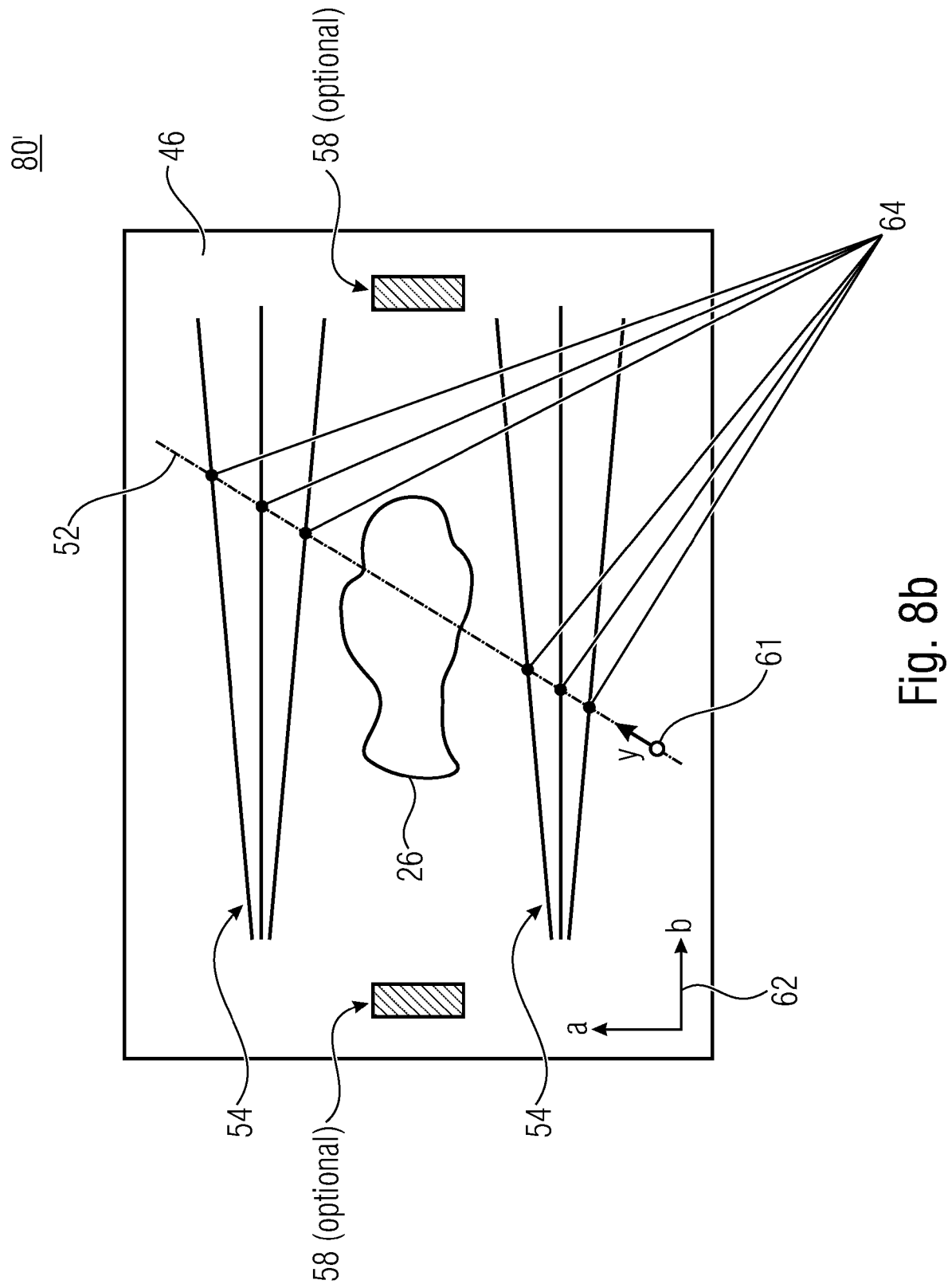
FIG. 8b shows a schematic top view of a device in accordance with a further embodiment, which additionally comprises optional information sources for rendering parameters and/or identifications of the object to be measured.
Figure 10A:
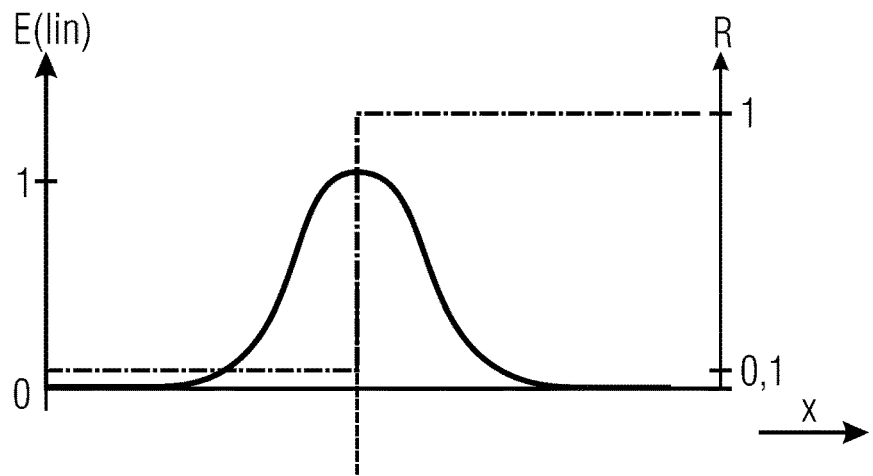
FIGS. 10a to 10c show various possibilities of evaluating an intensity distribution of FIG. 9b.
Figure 10B:
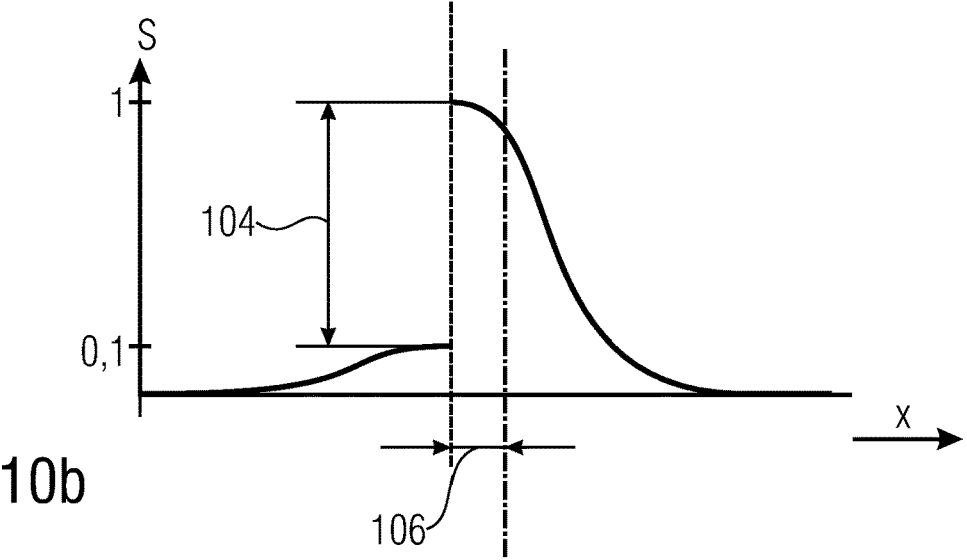
Figure 10C:
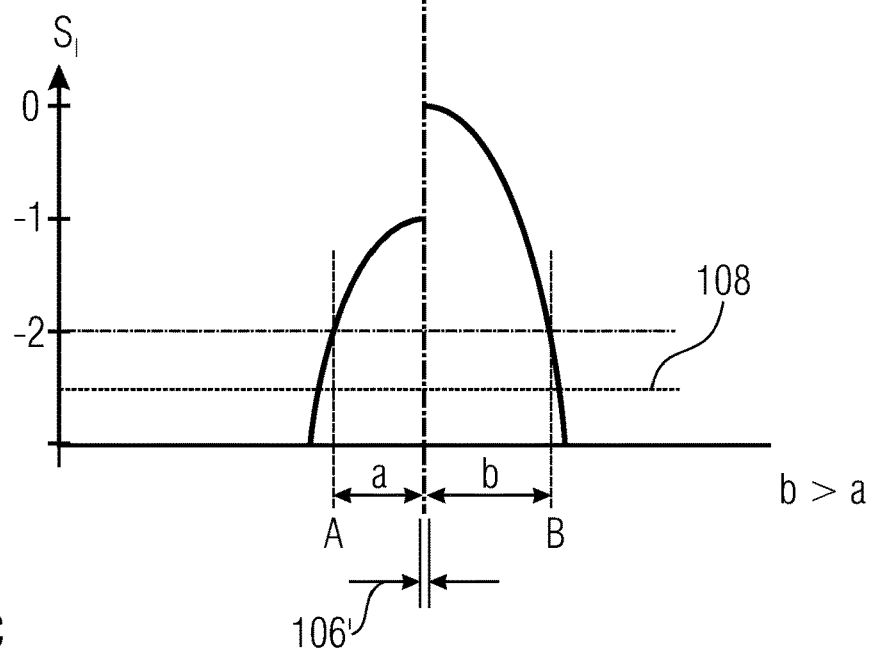
Figure 11A:
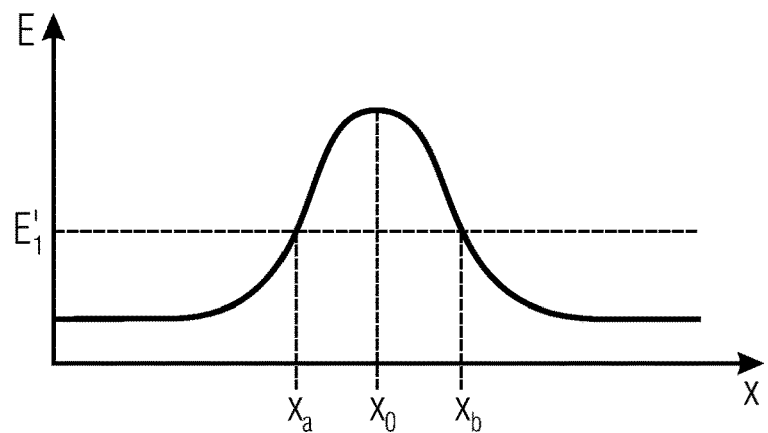
FIGS. 11a to 11c show further possibilities of evaluating intensity distributions.
Figure 11B:
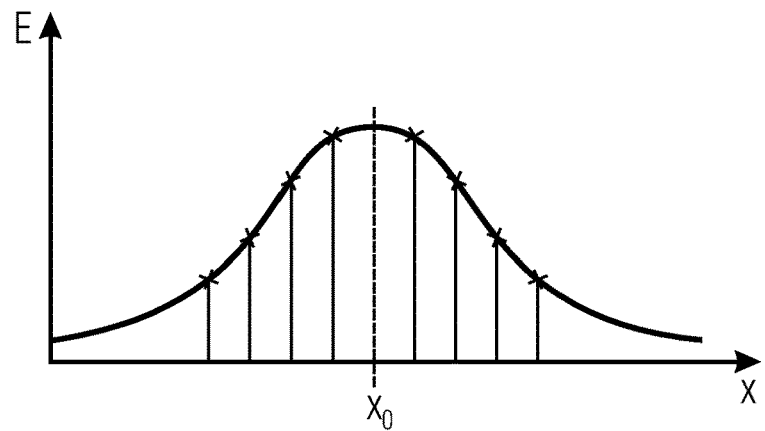
Figure 11C:
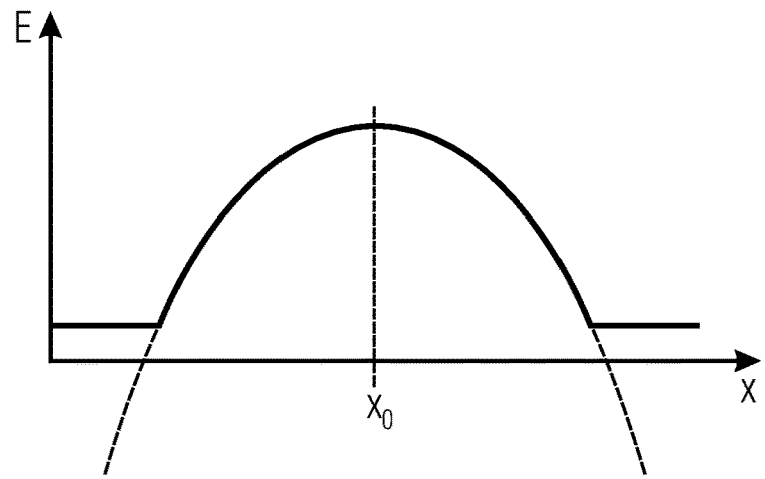

FIG. 8b shows a schematic top view of a device 80' in accordance with a further embodiment, which in addition to the marking 54 comprises optional information sources 58 for reproducing parameters and/or identifications. This may be effected, for example, by means of barcodes or the like. A coordinate system 61 which is aligned to the laser-line, e.g. which includes the direction y, may differ from a coordinate system 62 which is aligned to the support and is related to the carrier 46, e.g. by means of a spatial twist. Intersection points 64 of the laser line 52 with the markings 54 enable mutual transformation of the coordinate systems 62 and 61.

A first aspect of embodiments described herein defines a device comprising:
 illumination means (102) configured to emit a first illumination signal having a first illumination intensity ($E_1$) and a second illumination signal having a second illumination intensity ($E_2$) in the direction of a surface region (104) of an object to be measured, the second illumination intensity ($E_2$) being smaller than the first illumination intensity ($E_1$);

sensing means (101) configured to provide a first measurement signal based on a first reflection of the first illumination signal on the surface region, and to provide a second measurement signal based on a second reflection of the second illumination signal on the surface region;

evaluation means configured to combine the first measurement signal and the second measurement signal with each other so as to obtain a combination result from which a position of the first illumination signal on the surface region may be derived, wherein an influence of a reflectance of the surface region within the combination result is reduced as compared to the influence on the first and second measurement signals.

A second aspect defines a device of aspect 1, wherein the evaluation means is configured to logarithmically combine the first measurement signal and the second measurement signal with each other.

A third aspect defines a device of aspect 1 or aspect 2, wherein the evaluation means is configured to determine, on the basis of the combination result, a position of the first illumination signal on the surface region.

A fourth aspect defines a device of any of aspects 1 to 3, wherein the first illumination signal has a first intensity distribution, the first illumination intensity being a global maximum of the first intensity distribution, or wherein the second illumination signal has a second intensity distribution, the second illumination intensity being a global maximum of the second intensity distribution.

A fifth aspect defines a device of any of aspects 1 to 4, wherein the illumination means includes a laser line projector configured to emit the first illumination signal and the second illumination signal.

A sixth aspect defines a device of any of aspects 1 to 4, wherein the illumination means includes a line projector configured to emit the first illumination signal, and comprises a light source configured to illuminate the surface region in an illumination area in an essentially homogeneous manner, the illumination area being arranged such that the first illumination signal overlaps with the illumination area at least in some areas.

A seventh aspect defines a device of any of the preceding aspects, wherein the illumination means is configured to temporarily not emit the second illumination radiation when the first illumination radiation is being emitted.

An eighth aspect defines a device of any of the preceding aspects, wherein during a first measurement interval,
the illumination means is configured to emit the first illumination radiation, and wherein the sensing means is configured to sense a first picture of the surface region;

and wherein during a second measurement interval, the illumination means is configured to emit the second illumination radiation, and wherein the sensing means is configured to sense a second picture of the surface region.

An ninth aspect defines a device of aspect 8 which is configured to obtain, between the first measurement interval and the second measurement interval, an essentially unchanged relative position between the illumination means, the sensing means and the surface region.

A tenth aspect defines a device of aspect 9, further comprising an actuator configured to maintain the relative position in relation to the device essentially unchanged by a movement of the sensing means as a function of a movement of the surface region.

An eleventh aspect defines a device of aspects 8 to 10, wherein the sensing means comprises an image sensor comprising a first memory cell and a second memory cell for sensing a pixel of a picture of the surface region, the first memory cell being configured to store light information regarding the first snapshot, and the second memory cell being configured to store light information regarding the second snapshot, wherein the first and second memory cells are electrically or optically coupled to each other, so that captured image signals are identical within the first and second memory cells.

A twelfth aspect defines a device of any of the previous aspects, wherein the sensing means is configured to sense the first reflection and the second reflection by performing a snapshot method or a rolling-shutter method.

A thirteenth aspect defines a device of any of the previous aspects, wherein the first illumination signal includes a line pattern extending along a row direction on the surface region, and wherein the evaluation means is configured to sense the position of the reflection on the surface region along a column direction, which is arranged perpendicularly to the row direction, for a multitude of laterally offset columns.

A fourteenth aspect defines a device of aspect 13, wherein each determined position along the column direction may be associated with a pixel position on an image.

A fifteenth aspect defines a device of any of the previous aspects, wherein the evaluation means comprises a filter configured to subject the first measurement signal and the second measurement signal or the combination result to a filtering operation.

A sixteenth aspect defines a device of aspect 15, wherein the filtering operation comprises a convolution of the first measurement signal and of the second measurement signal or a convolution of the combination result with a convolution kernel or filter kernel implementing a course of a function.

A seventeenth aspect defines a device of aspect 16, wherein the course of the function comprises a si(x) function comprising a principal maximum and a number of additional maxima.

An eighteenth aspect defines a device of aspect 17, wherein the number of additional maxima is 2 or 4.

A nineteenth aspect defines a device of any of aspects 16 to 18, wherein the convolution kernel is formed to be asymmetrical with regard to the midperpendicular in the y direction.

A twentieth aspect defines a device of any of aspects 15 to 19, wherein the evaluation means is configured to obtain a filtering result on the basis of the filtering operation, and to derive, from the filtering result, the position of the first illumination signal on the surface region.

A twenty-first aspect defines a device of aspect 20, wherein the evaluation means is configured to derive the position while using a threshold criterion.

A twenty-second aspect defines a device of aspects 20 or 21, wherein the evaluation means is configured to compare the filtering result to a threshold value so as to derive the position of the first illumination signal.

A twenty-third aspect defines a device of any of aspects 15 to 22, wherein the first illumination signal includes a line pattern extending along a row direction on the surface region, and wherein the evaluation means is configured to sense the position of the reflection on the surface region along a column direction, which is arranged perpendicularly to the row direction, for a multitude of laterally offset columns, wherein the evaluation means comprises a plurality of filter kernels configured to subject the first measurement signal and the second measurement signal or the combination result to a filtering operation;

wherein the filter kernels are arranged along the column direction such that they are laterally offset to each other.

A twenty-fourth aspect defines a device of aspect 23, wherein the filter kernels comprise a mutual offset Δx which is smaller than a distance between two adjacent columns.

A twenty-fifth aspect defines a method comprising:

emitting a first illumination signal having a first illumination intensity ($E_1$) and a second illumination signal having a second illumination intensity ($E_2$) in the direction of a surface region (104) of an object to be measured, the second illumination intensity ($E_2$) being smaller than the first illumination intensity ($E_1$);

providing a first measurement signal based on a first reflection of the first illumination signal on the surface region, and providing a second measurement signal based on a second reflection of the second illumination signal on the surface region;

evaluating the first measurement signal and the second measurement signal by combining them with each other so as to obtain a combination result from which a position of the first illumination signal on the surface region may be derived, wherein an influence of a reflectance of the surface region within the combination result is reduced as compared to the influence on the first and second measurement signals.

A twenty-sixth aspect defines a computer program comprising a program code for performing the method of aspect 25.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable. Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Device comprising:
an illuminator configured to emit a first illumination signal comprising a first illumination intensity and a second illumination signal comprising a second illumination intensity in the direction of a surface region of an object to be measured, the second illumination intensity being smaller than the first illumination intensity;
a sensor configured to provide a first measurement signal based on a first reflection of the first illumination signal on the surface region, and to provide a second measurement signal based on a second reflection of the second illumination signal on the surface region;
an evaluator configured to combine the first measurement signal and the second measurement signal with each other so as to achieve a combination result from which a position of the first illumination signal on the surface region may be derived, wherein an influence of a reflectance of the surface region within the combination result is reduced as compared to the influence on the first and second measurement signals;

wherein the evaluator is configured to form a first logarithmized value on the basis of the first measurement signal and to form a second logarithmized value on the basis of the second measurement signal, wherein in the first logarithmized value and in the second logarithmized value, the influence of the reflectance is an addend, so that by subtracting the second logarithmized value from the first logarithmized value in order to achieve the combination result, the influence of the reflectance will be reduced;

wherein the first illumination signal and the second illumination signal comprise an identical wavelength range and are equally influenced, at an identical point within the surface region, by the reflectance or reflectivity of the surface region.

2. Device as claimed in claim 1, wherein the evaluator is configured to determine the position of the first illumination signal on the surface region on the basis of the combination result.

3. Device as claimed in claim 1, wherein the illuminator comprises at least one line projector in order to emit the first illumination signal and the second illumination signal; or wherein the illuminator comprises a line projector configured to emit the first illumination signal, and comprises a light source configured to illuminate the surface region in an illumination area in an essentially homogeneous manner, the illumination area being arranged such that the first illumination signal overlaps with the illumination area at least in some areas.

4. Device as claimed in claim 1, wherein the illuminator is configured to temporarily not emit the second illumination signal when the first illumination signal is being emitted.

5. Device as claimed in claim 1, wherein during a first measurement interval,
the illuminator is configured to emit the first illumination signal, and wherein the sensor is configured to sense a first picture of the surface region;
and wherein during a second measurement interval,
the illuminator is configured to emit the second illumination signal, and wherein the sensor is configured to sense a second picture of the surface region;
the device comprising an actuator configured to achieve, between the first measurement interval and the second measurement interval, an essentially unchanged relative position between the illuminator, the sensor and the surface region.

6. Device as claimed in claim 5, wherein the sensor comprises, for sensing a pixel of the first and second pictures of the surface region, an image sensor comprising a first memory cell, and comprising a second memory cell associated with said pixel, the first memory cell being configured to store light information regarding the first picture, and the second memory cell being configured to store light information regarding the second picture, or
wherein the image sensor comprises, for sensing a pixel of the first and second pictures of the surface region, a first memory cell associated with a first pixel and a second memory cell associated with a second pixel, the first memory cell being configured to store light information regarding the first picture, and the second memory cell being configured to store light information regarding the second picture, and wherein the first and second memory cells are electrically or optically coupled to each other, so that captured image signals are identical within the first and second memory cells.

7. Device as claimed in claim 1, wherein the evaluator comprises a filter configured to subject the first measurement signal or the second measurement signal to a filtering operation or to subject the combination result to a filtering operation and to derive the position of the first illumination signal on the surface region from the filtering result.

8. Device as claimed in claim 7, wherein the filtering operation comprises a convolution of the first measurement signal and/or of the second measurement signal or a convolution of the combination result with a convolution kernel or filter kernel implementing a course of a function.

9. Device as claimed in claim 8, wherein the course of the function comprises a si(x) function comprising a principal maximum and a number of additional maxima.

10. Device as claimed in claim 9, wherein the number of additional maxima amounts to 2 or 4.

11. Device as claimed in claim 8, wherein the convolution kernel is formed asymmetrically in relation to the midperpendicular in the y direction.

12. Device as claimed in claim 7, wherein the evaluator is configured to achieve a filtering result on the basis of the filtering operation, and to derive, from the filtering result, the position of the first illumination signal on the surface region.

13. Device as claimed in claim 12, wherein the evaluator is configured to compare the filtering result to a threshold value so as to derive the position of the projection of the first illumination signal on the surface of the object to be measured.

14. Device as claimed in claim 7, wherein the first illumination signal comprises a line pattern extending along a row direction on the surface region, and wherein the evaluator is configured to sense the position of the reflection on the surface region along a column direction, which is arranged perpendicularly to the row direction, for a multitude of laterally offset columns,
wherein the evaluator comprises a plurality of filter kernels configured to subject the first measurement signal or the second measurement signal or the combination result to a filtering operation;
wherein the filter kernels are arranged along the column direction such that they are laterally offset to each other.

15. Device as claimed in claim 14, wherein the filter kernels comprise a mutual offset which is smaller than a distance between two adjacent columns.

16. Device comprising:
an illuminator configured to emit a first illumination signal comprising a first illumination intensity and a second illumination signal comprising a second illumination intensity in the direction of a surface region of an object to be measured, the second illumination intensity being smaller than the first illumination intensity;
a sensor configured to provide a first measurement signal based on a first reflection of the first illumination signal on the surface region, and to provide a second measurement signal based on a second reflection of the second illumination signal on the surface region;
an evaluator configured to combine the first measurement signal and the second measurement signal with each other so as to achieve a combination result from which a position of the first illumination signal on the surface region may be derived, wherein an influence of a reflectance of the surface region within the combination result is reduced as compared to the influence on the first and second measurement signals;
wherein the illuminator comprises a line projector configured to emit the first illumination signal, and comprises a light source configured to emit the second illumination signal so as to illuminate the surface region in an illumination area in an essentially homogeneous manner, the illumination area being arranged such that the first illumination signal overlaps with the illumination area at least in some areas.

17. Method comprising:

emitting a first illumination signal comprising a first illumination intensity and a second illumination signal comprising a second illumination intensity in the direction of a surface region of an object to be measured, the second illumination intensity being smaller than the first illumination intensity;

providing a first measurement signal based on a first reflection of the first illumination signal on the surface region, and providing a second measurement signal based on a second reflection of the second illumination signal on the surface region;

evaluating the first measurement signal and the second measurement signal by combining them with each other so as to achieve a combination result from which a position of the first illumination signal on the surface region may be derived, wherein an influence of a reflectance of the surface region within the combination result is reduced as compared to the influence on the first and second measurement signals;

forming a first logarithmized value on the basis of the first measurement signal and forming a second logarithmized value on the basis of the second measurement signal, so that in the first logarithmized value and in the second logarithmized value, the influence of the reflectance is an addend, so that by subtracting the second logarithmized value from the first logarithmized value in order to achieve the combination result, the influence of the reflectance will be reduced;

wherein the first illumination signal and the second illumination signal comprise an identical wavelength range and are equally influenced, at an identical point within the surface region, by the reflectance or reflectivity of the surface region.

18. Method comprising:

emitting a first illumination signal comprising a first illumination intensity and a second illumination signal comprising a second illumination intensity in the direction of a surface region of an object to be measured, the second illumination intensity being smaller than the first illumination intensity;

providing a first measurement signal based on a first reflection of the first illumination signal on the surface region, and providing a second measurement signal based on a second reflection of the second illumination signal on the surface region;

evaluating the first measurement signal and the second measurement signal by combining them with each other so as to achieve a combination result from which a position of the first illumination signal on the surface region may be derived, wherein an influence of a reflectance of the surface region within the combination result is reduced as compared to the influence on the first and second measurement signals;

wherein said emission of the first illumination signal is performed by using a line projector, the surface region in an illumination area comprising the second illumination signal is illuminated by a light source in an essentially homogeneous manner, the illumination area being arranged such that the first illumination signal overlaps with the illumination area at least in some areas.

19. A non-transitory digital storage medium having a computer program stored thereon to perform the method comprising:

emitting a first illumination signal comprising a first illumination intensity and a second illumination signal comprising a second illumination intensity in the direction of a surface region of an object to be measured, the second illumination intensity being smaller than the first illumination intensity;

providing a first measurement signal based on a first reflection of the first illumination signal on the surface region, and providing a second measurement signal based on a second reflection of the second illumination signal on the surface region;

evaluating the first measurement signal and the second measurement signal by combining them with each other so as to achieve a combination result from which a position of the first illumination signal on the surface region may be derived, wherein an influence of a reflectance of the surface region within the combination result is reduced as compared to the influence on the first and second measurement signals;

forming a first logarithmized value on the basis of the first measurement signal and forming a second logarithmized value on the basis of the second measurement signal, so that in the first logarithmized value and in the second logarithmized value, the influence of the reflectance is an addend, so that by subtracting the second logarithmized value from the first logarithmized value in order to achieve the combination result, the influence of the reflectance will be reduced;

wherein the first illumination signal and the second illumination signal comprise an identical wavelength range and are equally influenced, at an identical point within the surface region, by the reflectance or reflectivity of the surface region, when said computer program is run by a computer.

20. A non-transitory digital storage medium having a computer program stored thereon to perform the method comprising:

emitting a first illumination signal comprising a first illumination intensity and a second illumination signal comprising a second illumination intensity in the direction of a surface region of an object to be measured, the second illumination intensity being smaller than the first illumination intensity;

providing a first measurement signal based on a first reflection of the first illumination signal on the surface region, and providing a second measurement signal based on a second reflection of the second illumination signal on the surface region;

evaluating the first measurement signal and the second measurement signal by combining them with each other so as to achieve a combination result from which a position of the first illumination signal on the surface region may be derived, wherein an influence of a reflectance of the surface region within the combination result is reduced as compared to the influence on the first and second measurement signals;

wherein said emission of the first illumination signal is performed by using a line projector, the surface region in an illumination area comprising the second illumination signal is illuminated by a light source in an essentially homogeneous manner, the illumination area being arranged such that the first illumination signal overlaps with the illumination area at least in some areas, when said computer program is run by a computer.

\* \* \* \* \*

UNITED STATES PATENT AND TRADEMARK OFFICE
CERTIFICATE OF CORRECTION

PATENT NO.        : 10,580,123 B2
APPLICATION NO.   : 16/137729
DATED             : March 3, 2020
INVENTOR(S)       : Doge et al.

It is certified that error appears in the above-identified patent and that said Letters Patent is hereby corrected as shown below:

On the Title Page

Item (73), delete "FRAUNHOFER-GESELLSCHAFT ZUR FÖRDERUNG DER" and insert therefor: -- Fraunhofer-Gesellschaft zur Förderung der angewandten Forschung e.V. --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*